US007681126B2

(12) United States Patent
Roose

(10) Patent No.: US 7,681,126 B2
(45) Date of Patent: Mar. 16, 2010

(54) METHOD FOR SPELL-CHECKING LOCATION-BOUND WORDS WITHIN A DOCUMENT

(75) Inventor: Denis Roose, Glen Allen, VA (US)

(73) Assignee: Edgetech America, Inc., Glen Allen, VA (US)

( * ) Notice: Subject to any disclaimer, the term of this patent is extended or adjusted under 35 U.S.C. 154(b) by 0 days.

(21) Appl. No.: 11/876,976

(22) Filed: Oct. 23, 2007

(65) Prior Publication Data

US 2008/0098302 A1      Apr. 24, 2008

Related U.S. Application Data

(60) Provisional application No. 60/862,635, filed on Oct. 24, 2006, provisional application No. 60/869,633, filed on Dec. 12, 2006.

(51) Int. Cl.
*G06F 17/21*    (2006.01)
*G06F 3/048*    (2006.01)

(52) U.S. Cl. .................. 715/257; 715/248; 715/256; 715/260; 715/264

(58) Field of Classification Search ............ 715/248, 715/256, 257, 260, 264, 271
See application file for complete search history.

(56) References Cited

U.S. PATENT DOCUMENTS

| 5,659,771 | A | * | 8/1997 | Golding ................. 715/257 |
| 5,889,518 | A | * | 3/1999 | Poreh et al. ............. 715/804 |
| 5,907,839 | A | * | 5/1999 | Roth ..................... 707/5 |
| 6,009,439 | A | * | 12/1999 | Shiomi et al. ............ 707/104.1 |
| 7,254,773 | B2 | * | 8/2007 | Bates et al. .............. 715/256 |
| 2003/0217052 | A1 | * | 11/2003 | Rubenczyk et al. ........ 707/3 |
| 2006/0031239 | A1 | * | 2/2006 | Koenig ................... 707/100 |
| 2006/0100779 | A1 | * | 5/2006 | Vergin ................... 701/211 |
| 2007/0239460 | A1 | * | 10/2007 | Sheridan ................. 704/277 |
| 2007/0276845 | A1 | * | 11/2007 | Geilich .................. 707/100 |

OTHER PUBLICATIONS

Technical Article; ESRI Support Center: How to: Use VBA to check spelling in text elements of graphics; 3 pages.

* cited by examiner

*Primary Examiner*—Stephen S Hong
*Assistant Examiner*—Wilson Tsui
(74) *Attorney, Agent, or Firm*—Thomas, Karceski, Raring & Teague, PC

(57) ABSTRACT

The present invention uses spatial dictionaries (termed locationaries), for meaningfully checking and correcting the spelling of text on Geographic Information System (GIS) maps or other computer documents containing spatially, or coordinate-, bound text. Locationaries keep track of correctly spelled words and the geographic areas within which they are considered correctly spelled. In a preferred embodiment, locationaries are feature classes, 'map layers' of properly-spelled words or attributed features (objects). The invention selects such features from locationaries based on spatial criteria relative to the textual objects to spell-check. It then exports the attribute values to dictionaries that can be used by conventional spell checking engines. Once all errors and suggestions are found with such an engine and within user-specified criteria, a dialog is shown that contains a row per potentially-misspelled word found. From that dialog, the user can edit the word in the original textual object of the map.

24 Claims, 14 Drawing Sheets

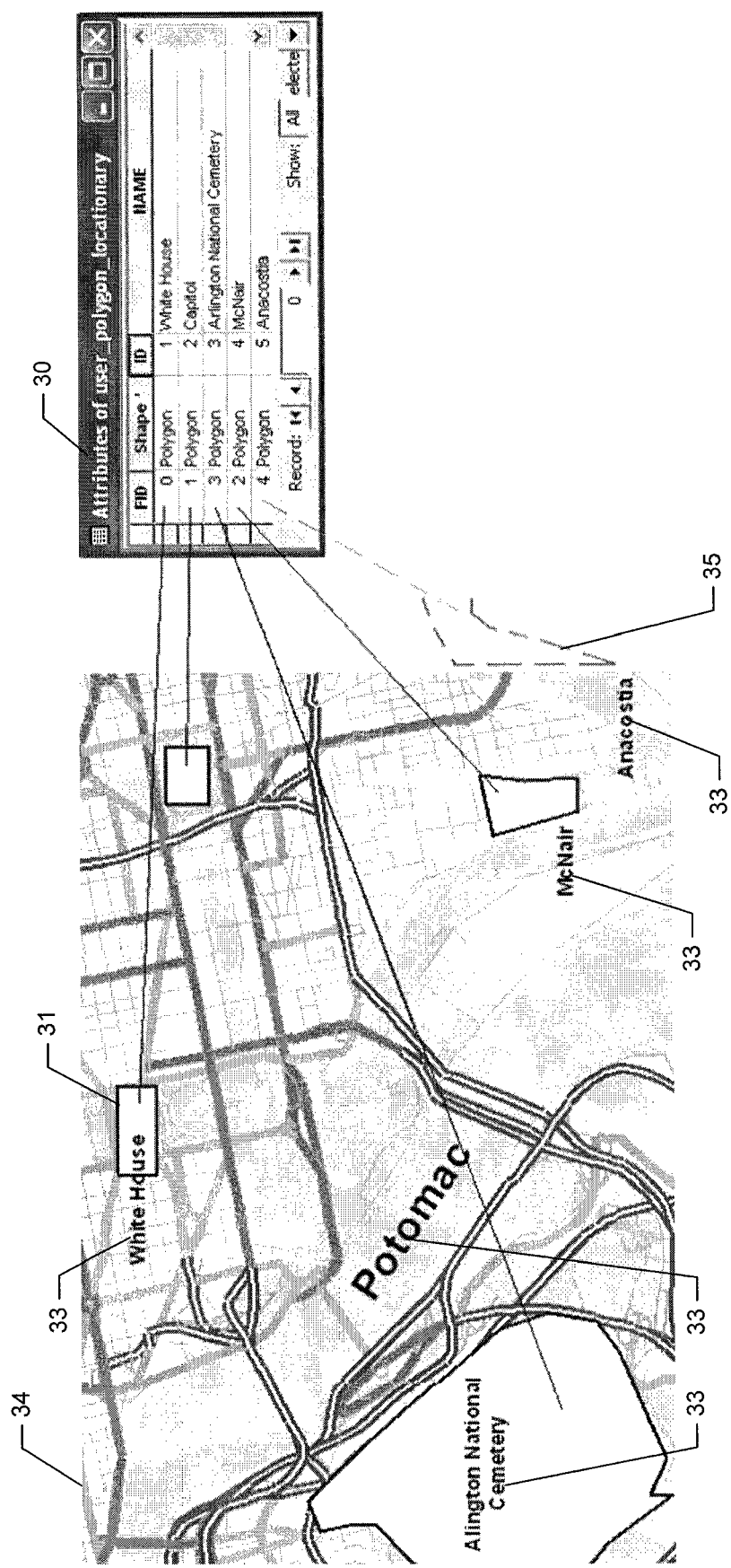

Set the spell checking engine to use the conventional language (DictL) and/or personal dictionaries (DictP), as applicable If visible at least one extent locationary has to be used,
    Create a blank visible extent dictionary DictX
    Add DictX to the list of dictionaries the spell checker needs to use
End If
For each visible extent locationary to be used
    Select the features within the visible extent of the map
    Export the string values of its appropriate attribute field to DictX
Next visible extent locationary to be used Create the TypoArray with cells for the typo reference No., typo string, its position within its
    text element, and a reference to the whole text element itself
Create the SuggestionArray with cells for the typo reference No. and its correct replacement suggestions
[Alternatively, all this information can be stored in a single array]

For each of its annotation groups
    For each text element
        For each word in the text element
            Spell-check the word against DictL, DictP and DictX together
            If the word is not a typo, go to next word
            If the word is a typo
                If at least one radius locationary is to be used
                    Create a blank radius dictionary DictR
                    For each radius locationary to be used
                        Select its features within a specified radius of the text element
                        Export the string values of its appropriate attribute field to DictR
                    Next radius locationary to be used
                    Spell-check the word against DictR
                End If
                If the word is [still] a typo,
                    Set the spell-checking engine to use as many of the 4 dictionaries as applicable: DictL, DictP, DictX, DictR
                    Have the spell-checking engine generate correct spelling suggestions to the typo
                    Populate the TypoArray for that typo
                    Populate SuggestionArray with correction suggestion words for that typo
                End If
            End If
        Next Word
    Next text element
Next annotation group Show the dialog with TypoArray, one word typo per row in the Potential Typos dialog  (see Figure 12)

FIG. 5A

Set the spell checking engine to use the conventional language (DictL) and/or personal dictionaries
(DictP), as applicable
If visible at least one extent locationary has to be used,
    Create a blank visible extent dictionary DictX
    Add DictX to the list of dictionaries the spell checker needs to use
End If
For each visible extent locationary to be used
    Select the features within the visible extent of the map
    Export the string values of its appropriate attribute field to DictX
Next visible extent locationary to be used
Create the TypoArray with cells for the typo reference No., typo string, its position within its text element, and a reference to the whole text element itself
Create the SuggestionArray with cells for the typo reference No. and its correct replacement suggestions
[Alternatively, all this information can be stored in a single array]
For each of its annotation groups
    For each text element
        For each word in the text element
            If the word is not in a danger dictionary (DictD)
                Spell-check the word against DictL, DictP and DictX together
                If the word is not a typo, go to next word
            Else
                The word is considered a typo
            End If
            If the word is a typo
                If at least one radius locationary is to be used
                    Create a blank radius dictionary DictR
                    For each radius locationary to be used
                        Select its features within a specified radius of the text element
                        Export the string values of its appropriate attribute field to DictR
                    Next radius locationary to be used
                    Spell-check the word against DictR
                End If
                If the word is [still] a typo,
                    Set the spell-checking engine to use as many of the 5 dictionaries as applicable: DictL, DictP, DictX, DictR, DictD
                    Have the spell-checking engine generate correct spelling suggestions to the typo
                    Populate the TypoArray for that typo
                    Populate SuggestionArray with correction suggestion words for that typo
                End If
            End If
        Next Word
    Next text element
Next annotation group
Show the dialog with TypoArray, one word typo per row in the Potential Typos dialog (see Figure 12)

FIG. 5B

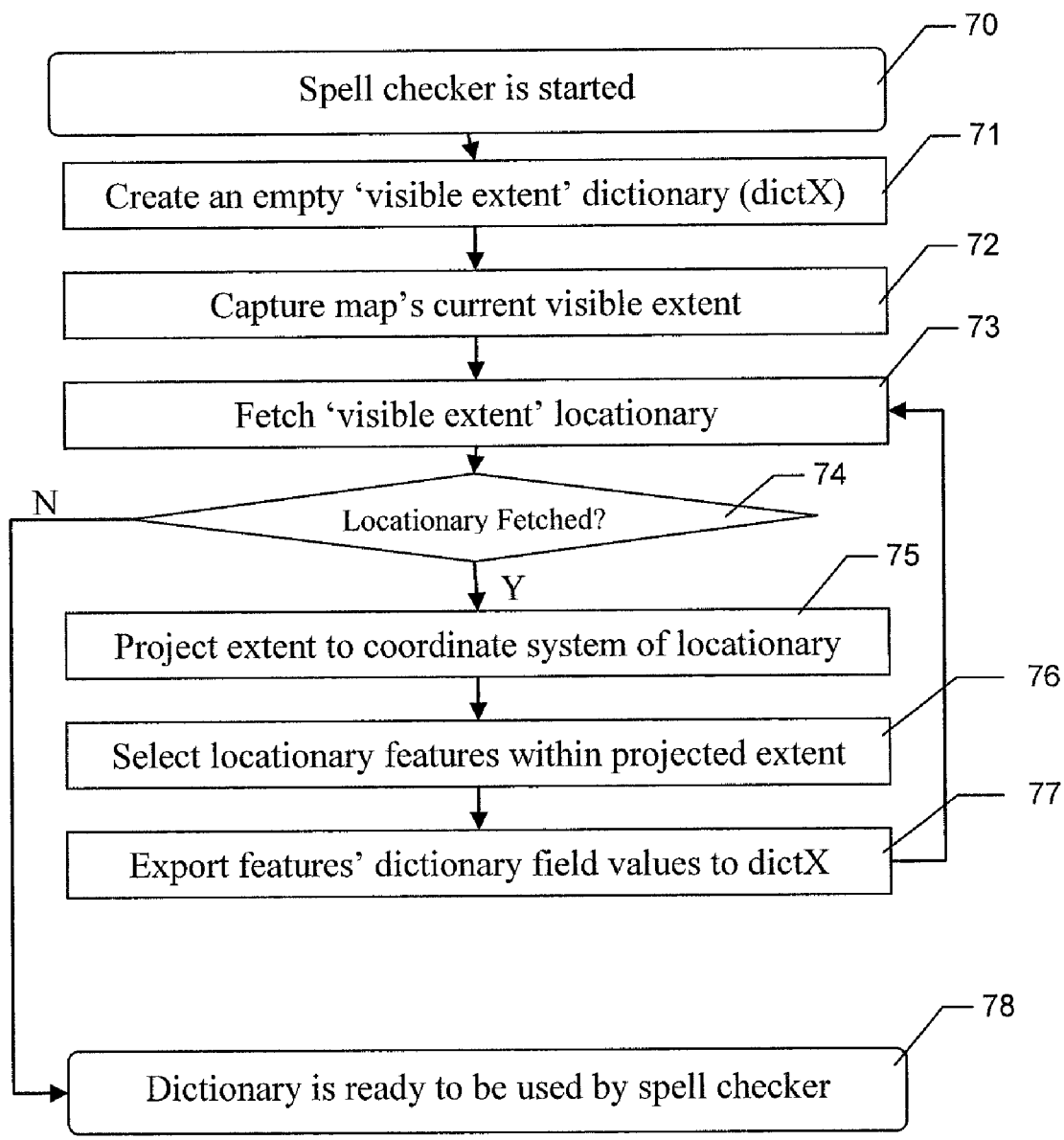

METHOD FOR SPELL-CHECKING LOCATION-BOUND WORDS WITHIN A DOCUMENT

CROSS-REFERENCE TO RELATED APPLICATIONS

This application claims priority to provisional U.S. Application No. 60/862,635, filed Oct. 24, 2006, and provisional U.S. Application No. 60/869,633, filed Dec. 12, 2006, the contents of which are incorporated herein by reference in their entirety.

FIELD OF THE INVENTION

The present invention generally relates to computer map, computer aided drafting (CAD), or graphic systems involving geographic, coordinate or otherwise spatially-bound text, and in particular, relates to finding and correcting misspelled words in such documents.

BACKGROUND OF THE INVENTION

Spell checking of text in word processors, spreadsheets, emails, web pages and other computer documents has become common place. Yet, geographic information system (GIS) software products do not include built-in spell checkers. A geographic information system is a system for capturing, integrating, storing, managing, editing, analyzing, sharing and displaying data and associated attributes which are spatially referenced, typically to the earth. One known GIS provider informs its power users on how to plug in a conventional spell checker to check the spelling of text against a conventional dictionary. However, such a solution does not take into consideration map-specific factors that render such a conventional method of spell-checking very ineffective.

One of the reasons for the lack of such spell checkers was the conceptual and technical difficulties related to the spell checking of geographically-bound text in maps. Much of the text in maps is geographically-bound and, as such, has to be spell-checked differently from text in other types of documents. Some map text is geographically-bound because the spelling of a particular word may be valid in one area of the map but may not be valid in another. For example, a city name is valid near the city of that name, but may not be valid elsewhere on the map. Another difficulty in spell-checking maps arises because many of the words on maps are proper nouns, such as geographic names. Alphabetic dictionaries, such as those used in word processors, may contain the spelling of some major geographic features such as countries and major cities but are unlikely going to contain local geographic names. This is for good reason, as there are millions of such local geographic names and most of those spellings are only valid at certain narrow locations.

Yet another difficulty arises because text in maps is typically in the language of the intended reader, in the language or languages of the locale where features (cities, churches, etc.) being labeled lie, or a combination. This makes the spell checking of such maps more challenging.

Furthermore, GIS databases and maps can contain enormous amounts of text. Spell checking and potentially correcting each word at a time, as conventional spell-checkers do, is not practical. Such serial, individual spell-checking wastes the users' time by requiring that they wait for the system to find each error before fixing it manually and proceeding to finding the next error.

In addition, one conventional spell-checker controls what text should be spell checked by requiring that the user first select each individual text object manually. Such a requirement is impractical in most situations.

BRIEF SUMMARY OF THE INVENTION

The present invention is a system, method, and computer program product, including spatial dictionaries (termed locationaries), danger dictionaries, domain dictionaries, and labeling engine abbreviation dictionaries, for meaningfully checking and correcting the spelling of text on Geographic Information System (GIS) maps or other computer documents containing spatially-bound or coordinate-bound text. Embodiments of the present invention use a new type of dictionary, termed a locationary™, to achieve this. Locationaries are dictionaries in which the spelling of words is valid only within certain geographic or spatial extents. Such dictionaries are designed to meaningfully spell check, among other things, location-bound words, including the names of locations.

In a preferred embodiment, locationaries are GIS feature classes, comprising "maps" of properly-spelled words or attributed features (objects). The invention selects such features from locationaries based on geographic criteria relative to the textual objects to spell-check or relative to the visible map extent. The invention then exports the attribute values to dictionaries that can be used by external spell checking engines. Once all errors and suggestions are found with such an engine and within the specified map extent, a dialog box is shown with an array that contains one row per misspelled word. From that dialog box, the user can edit the word from its original textual container on the map, zoom on it, bookmark its geographic extent, ignore it, delete it, substitute it by selecting spatially-correct suggestion words, or add it to a personal dictionary or locationary.

This innovation also provides for the automatic selection and use of language(s) in which individual words should be spell checked in a multi-lingual map. This is done by looking up a language map for the languages commonly spoken in the area of each piece of text to be spell checked, or having other spatial relationship with each individual text objects.

The invention is also designed to benefit from the ability of gazetteer data and Internet map services to function as dictionaries or locationaries for spell checking. This constitutes a new usage for such digital data and map services. The system also claims other innovations that make this overall process possible, efficient or user-friendly.

The effective automation of the spell checking of a whole map document using spatially-aware locationaries is highly valuable as it provides significant labor savings over manual methods, is likely more consistently accurate, and it avoids the embarrassment of typographical errors (typos) on maps and the time-consuming and resource-intensive reprinting of maps. Packaging this functionality into a toolbar that is fully integrated with the GIS system makes it accessible to, and easy to use by, all GIS users. In other words, the invention GIS-enables the spell checker. This is in contrast with the complexity of having to follow a lengthy, unstable procedure for accessing the functionality of an external spell checker.

In one embodiment of the invention, a method for spell-checking location-bound words within a document comprises the steps of: providing a locationary comprising a plurality of words and, for each word, a corresponding location within which a spelling of the word is valid; and comparing a location-bound word to those words in the locationary whose valid location corresponds to a location in the document of the location-bound word to determine if the location-bound word is correctly spelled. The document may be a map and the location in the document of the location-bound word may correspond to a geographic location. The valid location of each locationary word may comprise an annotation feature, point, line, bounded two-dimensional area, or bounded three-dimensional volume. The valid location of a locationary word may correspond to the location in the document of the location-bound word if at least part of the annotation feature, point, line, bounded area, or bounded volume of the locationary word falls either within a visible extent of the document or within a predefined or user-specified spatial relationship from the location-bound word.

The method may further comprise the steps of: identifying a word in the locationary that matches a textual label of a feature in the document; calculating a distance between the textual label and the valid location of the matching word; and comparing the calculated distance to a predefined or user-specified maximum acceptable distance to determine if the textual label is too far from the label's associated feature.

In one embodiment of the invention, the method may further comprise the step of: creating an ad hoc dictionary comprising those words in the locationary whose valid location corresponds to the location in the document of the location-bound word. In this embodiment, the method may further comprise the steps of: providing the ad hoc dictionary to a spell-checking software program; and providing a location-bound word to the spell-checking software program; wherein the comparing step is performed by the spell-checking program using the ad hoc dictionary. The method may yet further comprise the step of: providing all location-bound words within a visible extent of the document to the spell-checking software program to enable the spell-checking program to determine if the location-bound words are correctly spelled using the ad hoc dictionary. The method may further comprise the steps of: receiving a list of potentially misspelled words from the spell-checking program; creating a second ad hoc dictionary comprising those words in the locationary whose valid location corresponds to a portion of the document within a predefined or user-specified spatial relationship from one of the potentially misspelled words; providing the second ad hoc dictionary to the spell-checking software program; and providing the one of the potentially misspelled words to the spell-checking software program to enable the spell-checking program to re-check the one of the potentially misspelled words using the second ad hoc dictionary.

In another embodiment of the invention, the method may further comprise the steps of: providing a plurality of locationaries, at least some of the locationaries each corresponding to a different language; determining which one or more languages are commonly spoken in the geographic location corresponding to the document location of the location-bound word; selecting the one or more locationaries which correspond to the one or more languages commonly spoken in the geographic location corresponding to the document location of the location-bound word; and comparing the location-bound word to those words in the selected locationaries whose valid location corresponds to the document location of the location-bound word to determine if the location-bound word is correctly spelled in one of the commonly spoken languages corresponding to the document location of the location-bound word. In this embodiment, the method may further comprise the steps of: creating an ad hoc multi-language dictionary or a plurality of uni-language dictionaries comprising those words in the selected locationaries whose valid locations correspond to a visible extent of the document; and providing the ad hoc multi-language dictionary or the plurality of uni-language dictionaries to a spell-checking software program. Alternatively, the method of this embodiment may further comprise the steps of: determining which language is a preferred language of a user; and selecting a locationary which corresponds to the preferred language of the user; wherein comparing the location-bound word to those words in the selected locationaries whose valid location corresponds to the document location of the location-bound word further determines if the location-bound word is correctly spelled in the preferred language of the user.

The locationary may comprise a plurality of words in a plurality of different languages and, for each word, a corresponding geographic location within which a spelling of the word is valid and within which the language of the word is commonly spoken, such that comparing the location-bound word to those words in the locationary whose valid location corresponds to a location in the document of the location-bound word further determines if the location-bound word is correctly spelled in the commonly spoken language.

The method may further comprise the steps of: providing a plurality of conventional dictionaries, at least some of the dictionaries each corresponding to a different language; determining which one or more languages are commonly spoken in the geographic location corresponding to the document location of the location-bound word; selecting one or more of the conventional dictionaries which correspond to the one or more languages commonly spoken in the geographic location corresponding to the document location of the location-bound word; and comparing the location-bound word to those words in the selected dictionaries whose valid location corresponds to the document location of the location-bound word to determine if the location-bound word is correctly spelled in the one or more commonly spoken languages.

The method may further comprise the step of: if the location-bound word is determined to be correctly spelled by the first comparing step, further comparing the location-bound word to those words in the locationary whose valid location falls within a predefined or user-specified spatial relationship from the location-bound word to determine if the location-bound word is correctly spelled; wherein the location-bound word will be considered to be too far from a feature labeled by the location-bound word if the location-bound word is determined to be incorrectly spelled by the second comparing step.

The method may further comprise the steps of: repeating the comparing step for a plurality of location-bound words; after each comparing step and for each incorrectly spelled location-bound word, determining one or more suggested spelling corrections; and, after each determining step, storing the one or more determined suggested spelling corrections.

In an alternative embodiment, a method for spell-checking location-bound words within a document comprises the steps of: providing a plurality of dictionaries, at least some of the dictionaries each corresponding to a different language; determining which one or more languages are commonly spoken in a geographic location corresponding to the document location of the location-bound word; selecting the one or more dictionaries which correspond to the one or more languages commonly spoken in the geographic location corresponding to the document location of the location-bound word; and comparing the location-bound word to those words in the selected dictionaries whose valid location corresponds to the document location of the location-bound word to determine if the location-bound word is correctly spelled in the one or more commonly spoken languages. Such a method may further comprise the steps of: determining which language is a preferred language of a user; and selecting a dictionary which corresponds to the preferred language of the user;

wherein comparing the location-bound word to those words in the selected dictionaries whose valid location corresponds to the document location of the location-bound word further determines if the location-bound word is correctly spelled in the preferred language of the user.

In another alternative embodiment, a method for controlling an amount of text within a document to be spell-checked comprises the steps of: selecting, by a user, one of (a) a page layout or (b) one or more text objects within a page layout; and spell-checking only text that is visible within the selection.

In addition to the methods for spell-checking location-bound words within a document, the methods for finding text that is too far from its corresponding map feature, and the method for controlling an amount of text within a document to be spell-checked as described above, other aspects of the present invention are directed to corresponding systems and computer program products for spell-checking location-bound words within a document, for finding text that is too far from its corresponding map feature, and for controlling an amount of text within a document to be spell-checked.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A is an illustration of how the visible extent locationary works, in accordance with one embodiment of the present invention;

FIG. 5A is an illustration of pseudo-code for detecting spelling errors in a GIS map's text graphics and displaying a dialog with the errors, in accordance with one embodiment of the present invention;

FIG. 5B is an illustration of pseudo-code for detecting spelling errors in a GIS map's text graphics and displaying a dialog with the errors when a danger dictionary is added to the scenario of FIG. 5A, in accordance with one embodiment of the present invention.

FIG. 7 is a flowchart illustrating the process for creating a 'visible extent' dictionary for a specified map, in accordance with one embodiment of the present invention;

FIG. 11 illustrates the setting of the spell checker's Locationary properties, in accordance with one embodiment of the present invention;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention makes it possible to meaningfully spell check maps and other documents where text is location-bound, such as geographically-bound, spatially-bound, or coordinate-bound. In a preferred embodiment, the present invention is configured to spell check GIS map documents. In a preferred embodiment, the systems and methods of the present invention have been implemented for the ArcGIS™ GIS software architecture, using the Microsoft Visual Studio programming environment, Wintertree Software, Inc.'s WSpell conventional spell checking ActiveX engine, and ComponentOne, LLC's True DataControl array and True DBGrid Pro to respectively store and present errors. Those skilled in the art will find that the present invention can be applied to many environments.

The invention solves the challenges associated with the spell checking of maps by implementing and combining many innovations such as: (1) integrating a spell checking engine component in, and packaging a GIS map spelling utility as, a GIS software toolbar and extension; (2) inventing locationaries and methods to use them; (3) devising methods for using danger (also called exclusion) dictionaries in map spell checking; (4) inventing a new use for gazetteer digital data and map services as locationaries; (5) controlling the amount of text to be spell checked; (6) focusing on optimizing the user experience; and (7) employing innovative programming techniques to access, store and edit text objects.

Figure 1:
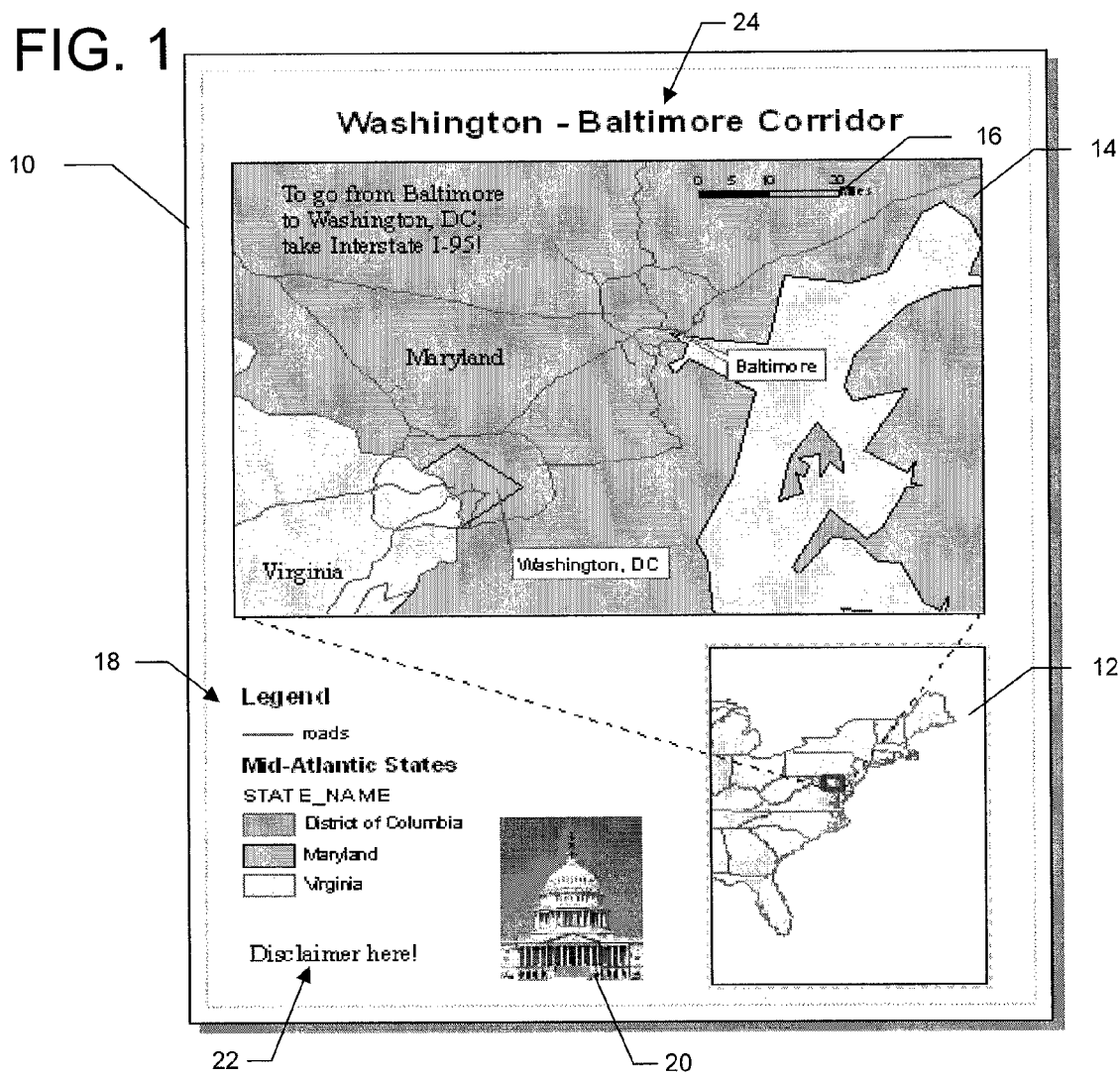
FIG. 1 illustrates an example of a GIS layout page, in accordance with one embodiment of the present invention.

Most information and phenomena can be tied to a particular region in time and space. GIS computer software can integrate, analyze and communicate such information. One of the ways it does this is by producing electronic and paper maps. Referring now to FIG. 1, an example of a GIS layout page (element 10) is illustrated, in accordance with one embodiment of the present invention. From a GIS perspective, a paper map is a layout page that has been printed on paper. A layout page (also termed page layout) may have several placeholders for actual maps and may directly contain other objects, either with text (e.g., legends, text graphics, etc.) or without text (e.g., pictures, geometry graphics such as lines, etc.). The example page of FIG. 1 contains placeholders for a large map 14 and for a smaller inset map 12. Maps are also called data frames in ArcGIS terminology. Each of these maps has a graphics layer that can contain graphics and graphics groups which themselves can also contain text and other types of graphics. The layout page has its own graphics layer which can directly contain a variety of non-map objects such as scale bars 16 (here placed over the large map), legends 18, pictures 20, text graphics (such as disclaimers 22 and map titles 24).

The large map in FIG. 1 contains geographically-bound text: the state names (Maryland, Va.) and the city names (Baltimore, Washington, D.C.). The driving directions in the upper left corner are not geographically-bound and could have been created in either the large map's graphics layer or in the page's graphics layer. In the latter case, the driving directions may have been graphically placed over the large map like the scale bar to its right, without however 'belonging' to the large map.

There are other ways of adding text to a map, for example, by labeling layers of data, by adding annotation feature classes or Internet/intranet map services to the map. There may also be three-dimensional (3-D) text objects in 3-D maps or scenes. All these types of textual objects have their own behavior and properties. The embodiment of the invention presented here illustrates the invention using text graphics, but the principle is the same for the other types. Unless otherwise specified, all references to 'text' or "word" herein apply to all types of text.

Text in the layout page's graphics layer (typically map name, disclaimer, etc.) is not geographically-bound and is generally placed around the actual maps, but may also be placed over, but separate from, the maps.

Embodiments of the present invention relate to, among other things, spell checking coordinate-bound, geographically-bound, and non-geographically bound text residing in the maps themselves or anywhere on the layout page; ways that users may specify which text to spell check; how the invention restricts the spell checking to a manageable and meaningful extent; and how the invention finds suggestions and present its findings and lets the user interact with them.

The architecture of the invention is innovative and beneficial in that it is the first time a spell checker engine and/or component is packaged and delivered inside a GIS toolbar and as an extension. This guarantees full control by the invention and that the spell checking engine is available when needed. It avoids licensing and versioning issues that may arise with external, non-integrated spell checking engines (assumed to reside on the end user's computer). It is also significantly faster, and more user-friendly, than calling the Microsoft spell checker which is optimized to spell check a MS Word document and not a map document The integration of the spell checking engine inside the GIS enables the toolbar/extension developers to hide the complexity of spell checking the many types of GIS objects that can potentially contain text and typos. This integration also allows the developers to take advantage of the GIS software functionalities, specifications, and data, such as domains and (labeling engine) abbreviation dictionaries. A domain is a list or range of valid values than can be contained in a field in an attribute table. High-end labeling engines use a variety of techniques to automatically place text from feature class attribute tables near the corresponding features on maps while avoiding overlapping labels. One such technique is to use an abbreviation dictionary. A labeling engine may use an abbreviation dictionary if there isn't enough room to place the non-abbreviated version of a word on the map. Using such a dictionary, the invention may label a road "Washington Blvd", even though the actual road name in the road's feature attribute table is "Washington Boulevard", if that abbreviation is in the dictionary.

Embodiments of the present invention uses locationaries to spell check location-bound text. Locationaries are dictionaries with correctly-spelled, location-bound words. Locationaries are an improvement over conventional dictionaries in that locationaries can be used to spell check documents where the spelling error status of a word depends on the word's location within a document. Locationaries can contain words whose spelling is valid only within certain spatial, coordinate extents. Locationaries keep track of the valid locations of the words themselves.

Words from a conventional dictionary are location-independent. By placing words in such a dictionary, one makes the words correct anywhere in the universe, in the dictionary's language. On the other hand, words in locationaries are only valid within their defined point, area or volume of validity. Locationaries can therefore also be used to spell check non-geographically-bound words, for example the words on the page layout itself (in legends, disclaimers, etc.). A check box could be added to FIG. 11 for each locationary available to let users decide if they would like to allow the locationary to spell check non-geographically-bound words. All the words from such locationaries would then be used to spell check the non-geographically-bound words.

The coordinate systems that define these locations and spatial extents can vary greatly based on what's being 'mapped.' It could be as varied as a multi-dimensional projected coordinate system of the Earth (two-dimensional (2-D) maps or 3-D models), a coordinate system to map the human body, a drawing page (e.g., computer assisted drawing (CAD)) or a page of text with some sort of word placement system. Embodiments of the invention presented here deal with 2-D projected coordinate systems of the earth.

Figure 2:
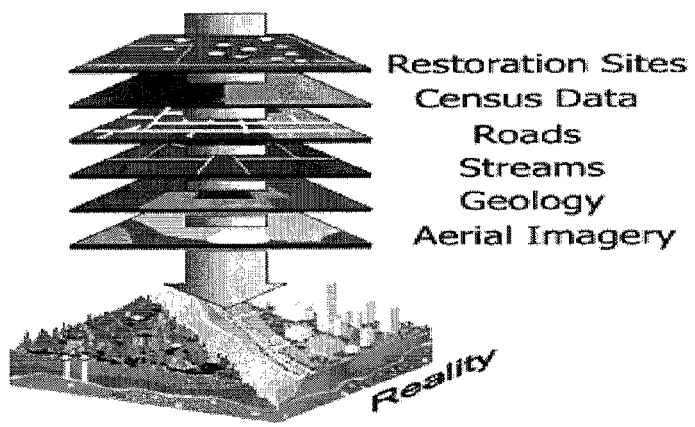
FIG. 2 illustrates GIS layers as the building blocks of a GIS map, in accordance with one embodiment of the present invention.

GIS maps are made by overlapping individual thematic map layers. FIG. 2 illustrates GIS layers as the building blocks of a GIS map, in accordance with one embodiment of the present invention. Not only do layers point to some GIS data typically captured from reality (illustrated as the bottom layer in FIG. 2), layers also present these data sets in a cartographic manner (with symbology, labels, etc.). There are a variety of types of layers—two common ones are the feature and image layers. Image layers represent the content of an image, typically an aerial or satellite image of some place on earth. Overlapping those individual layers is possible when each has a known, or shares the same, coordinate system. Feature layers represent data containing drawings of their features (i.e., the objects being mapped) as points, lines, polygons, annotations, etc. One such layer of data may represent the location of cities in the world using points; another, its major rivers using lines; another, the area of countries using polygons. Feature layers point to, and symbolize, feature data stored as feature classes. A feature class is defined as a thematic grouping of features of the same geometric type within one coordinate system and data source.

Figure 3:
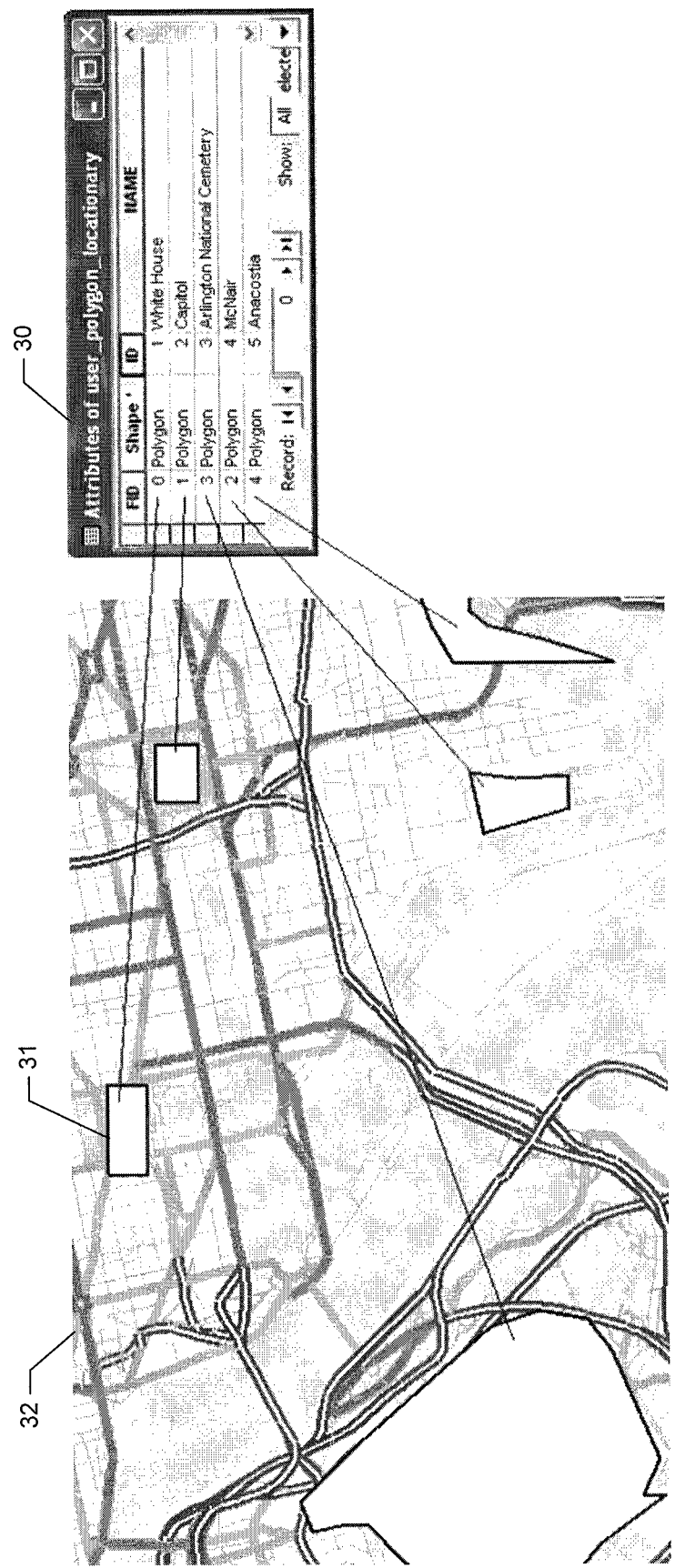
FIG. 3 is an illustration of locationary features (over a street map background) and associated attribute table, in accordance with one embodiment of the present invention.

GIS feature data have at least two components: tabular (as illustrated in feature attribute table 30 of FIG. 3) and geometric (as illustrated by polygon 31 of FIG. 3). Each GIS feature has a tabular representation as a record in its feature class' attribute table and a geometric representation such as a point, line, polygon or annotation.

In the embodiment presented here, locationaries are GIS feature classes of polygon features with a field containing the properly spelled word or word combination. Each entry in the attribute table corresponds to a properly spelled word (or combination of words) and an associated polygon geometry that defines the smallest location at which the spelling of the word (or word combination) is correct.

The locationary's attribute table 30 includes the properly spelled words in the "NAME" column, while the locationary feature's geometry corresponds to the "Shape" column and is represented in FIG. 3 by the white polygons (including 31) on map 32. The combination of the attribute table and the associated polygons comprise the locationary. The relationship between the locationary attribute table 30 records and their corresponding geometries is illustrated in FIG. 3 by the five straight lines connecting the rows of the table to the white polygons on the map. These locationary polygon features are easily created by one skilled in the art of GIS systems. Polygon features may be predefined, or may be created as needed by a user. They may precisely delineate what they represent on the map, or may be coarse representations. The "Arlington National Cemetery" polygon precisely follows the cemetery's boundary while the rectangular polygons are coarse representations of the "White House", and "Capitol" for example.

Figure 4B:
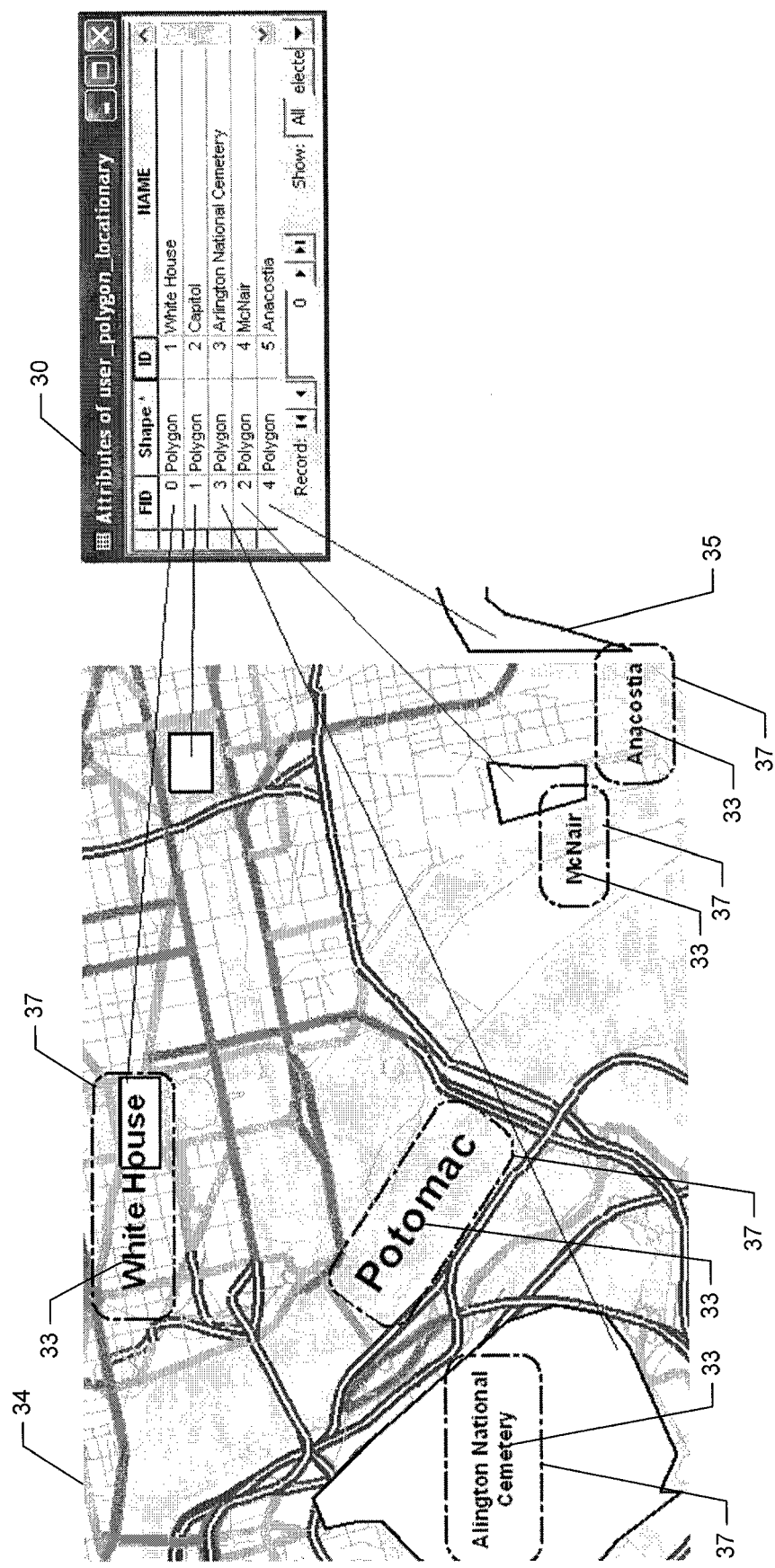
FIG. 4B is an illustration of how a radius locationary works, in accordance with one embodiment of the present invention.

The Eastern boundary of Map 32 has been moved slightly westward such that the locationary feature 35 corresponding to "Anacostia" is no longer visible on the resulting Map 34 of FIG. 4A and FIG. 4B. The map text elements 33 have also been added onto Map 34 of both figures. This text 33 is not part of the locationary, It's the text that needs to be spell checked: "White House", "Potomac", "Alington National Cemetery", "McNair", and "Anacostia". Some of these map text elements correspond to locationary features of the same name and show a variety of positions relative to their corresponding locationary features (white polygons). The map text "White House" is partially over its corresponding locationary feature; map text "McNair" and "Anacostia" are adjacent to their corresponding locationary feature; "Potomac" and "Anacostia" do not have a locationary feature in the currently visible extent of the map; "Alington National Cemetery" is included within the area of the "Arlington National Cemetery" locationary feature but does not have the same spelling.

Locationary features can be used to spell check text on maps by comparing their spelling to those of locationary features within a spatial relationship to them. For example (as illustrated in FIG. 4A), should the spatial relationship be that the locationary features should be within the currently visible extent of map, the map text "White House" and the map text "McNair" would be found correctly spelled while the map text "Potomac" and "Anacostia" would not because no identically-named locationary feature ("Potomac" and "Anacostia", respectively) resides in the current visible extent of the map. "Alington National Cemetery" would also be considered misspelled (because it does not match the locationary feature "Arlington National Cemetery") but the system should be able to offer its correct replacement suggestion "Arlington National Cemetery" as only the letter "r" differentiates the two. By combining this locationary with a conventional dictionary without proper nouns, such a system would likely find that "Alington", "Anacostia", and possibly "Potomac" (a conventional dictionary may include "Potomac" due to the significance of this river) would be misspelled.

While FIG. 3 illustrates a polygonal locationary feature class, other types of feature classes may be used, such as, point, line or annotation. However, using polygon locationary features offers the flexibility of creating locationary features of any shape and extent (even multi-part polygon features). The polygons can be regular or irregular, and they can closely conform to the actual physical boundaries of map locations, or they can merely roughly conform. It is quicker to set up polygons that roughly conform, while it is more accurate but slower to set up polygons that closely conform. Assuming that conventional dictionaries are turned off, having a large polygon feature representing the entire United States and a smaller one representing the Commonwealth of Virginia, enables the word 'U.S.A.' to be valid on a wider area than the word 'Virginia'. And because polygon features can be made of multiple polygon geometries (multi-part polygon feature), the word "U.S.A." can also be valid over Hawaii, Alaska, etc.

The invention is independent of the underlying format of the locationary: shapefile, geodatabase, web service, etc. The presented embodiment uses the shapefile format. This enables GIS organizations to easily create such locationaries with tools they are already familiar with, or to purchase such locationaries in a format that is readily available. Because the invention itself is independent of the underlying format of the data, it is capable of using gazetteer data and map services as locationaries. Those services can be provided internally through an intranet by the organization where the user works, or externally through the Internet by organizations who, for example, specialize in building map gazetteers. In addition to offering map services, those organizations could also provide ad hoc dictionaries or locationary spell checking services. In this latter case, the spell checking process may happen on a computer separate from the computer where the map being spell checked resides. The service would, for example, return a list of valid suggestions or confirm that a word is correctly spelled.

In a manner analogous to the two types of dictionaries in conventional spell checkers, embodiments of the present invention may use two types of locationaries: system (also called language) and user (also called personal). System locationaries can be built thematically (as is common practice with other GIS feature classes), or not. One thematic locationary may include, for example, place names (e.g., countries, states, cities, towns, etc.) while another thematic locationary may include streets with street names. The invention is designed to use several system locationaries at a time, if needed.

System locationaries are generally institutional locationaries. They may have been bought, licensed (as gazetteer web service or otherwise), or created internally by an organization. It is shared by all the users of that system. They typically have gone through a quality control process. The GIS spell checker of the present invention intentionally does not allow a user to customize that type of locationary. On the other hand, user dictionaries are created for each user to hold features with words they have personally deemed correctly spelled. Note that unlike with conventional dictionaries and purposely so, system locationaries can be edited by the GIS software, just not through the spell checker user interface. Organizations can develop GIS and quality-control methods to add their users' personal locationary information into common system locationaries on frequencies that they decide upon themselves. User locationaries can be edited through the spell checker interface or with other GIS tools.

In a preferred embodiment of this invention, system locationaries are expected to be built thematically, with one feature class per theme: roads, parcels, etc. Personal locationaries, in contrast, are not thematic in the current embodiment of the invention, although they could have been. Personal locationaries contain a mixture of features (parcels, buffered roads) whose only reason to be there is that they contain properly spelled words within the extent of the feature. One personal locationary could have a feature containing a street name while another could contain a land-use code. The invention will work regardless of whether either or both system and personal locationaries are built thematically or not. Similarly, locationaries can be single language or multi-language depending on what the user goals and circumstances.

Embodiments of the present invention may use danger dictionaries. Danger dictionaries are dictionaries of words that are correctly spelled but that should require confirmation by users. For example, the word "pubic" is correctly spelled in English but rarely appears on maps and is often a misspelling of the word "public". If in a danger dictionary, when the word pubic would be encountered on a map, the system would display it as a potential typo and offer the current spelling ("pubic") to indicate that the word is a valid word, but it would also offers the word "public" as a possible substitution. A danger word is a word that is considered misspelled throughout the whole process and therefore the invention goes through the full routine to identify suggestion words, including from locationaries. Additionally, danger dictionaries can also be used to make sure someone's name is correctly spelled. For example, a disclaimer may refer to a commissioner of revenues called Mr. Rose, while that person's actually name is Mr. Roose. If the Rose-Roose combination is in the danger dictionary, each time "Rose" would be encountered, it would be considered as a potential typo and the "Roose" substitution would be offered in addition to "Rose".

Figure 11:
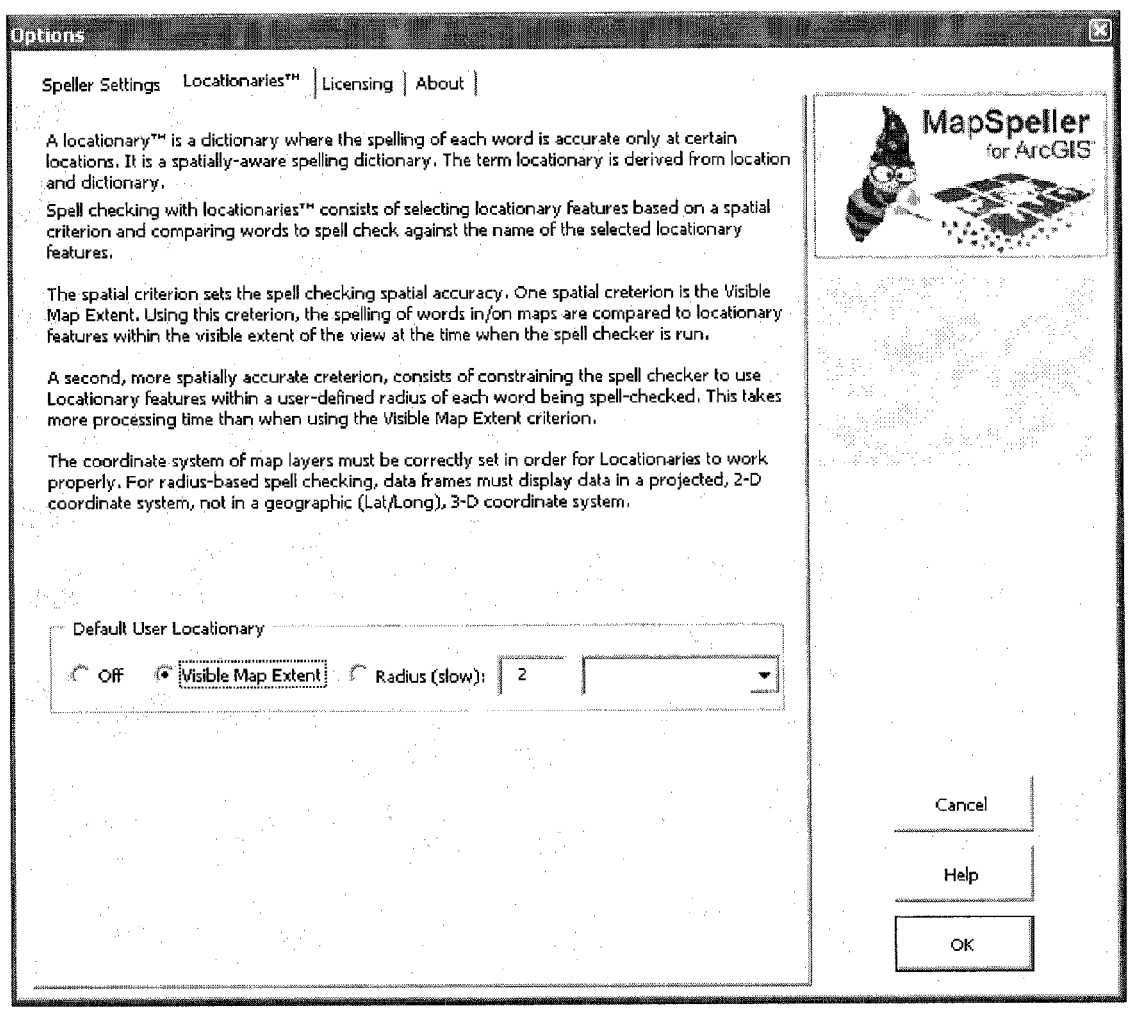
FIG. 11 illustrates the setting of some of the spell checker conventional properties, in accordance with one embodiment of the present invention.

The overall process of locationary spell checking consists of three steps: error detection, error communication, and error correction. In its most simplified expression, the error detection process comprises setting the properties of a conventional spell checker and feeding it the words to be spell-checked one at a time along conventional and ad hoc spatially-correct dictionaries. The concept of locationary spell checking is that a word/string in a map is deemed accurate if it has a specified spatial relationship with (typically if it is close enough to) the location of a locationary feature with the same (ire., matching) word/string. In the embodiment of the invention presented here, users are given two ways of specifying what is "Close enough". In one option (illustrated in FIG. 4A), the locationary feature must be within the currently visible extent of the map. Map data can extend beyond the currently visible map extent which acts as a lens, a window on the data from the GIS feature classes, and this option excludes words outside of the visible extent. In another option (illustrated in FIG. 4B), the locationary features must be within a spatial relationship of the misspelled word, for example within a radius/buffer distance that can be specified by the user through the spell checker Options dialog (the Options dialog is illustrated in FIG. 11).

An ad hoc dictionary is created and provided to the conventional spell checker (in addition to the words to be checked), and the spell checker uses the ad hoc dictionary (as well as one or more conventional dictionaries) to spell check the provided words. The ad hoc dictionary is created from the locationaries, and comprises the words/strings from those locationary features whose locations correspond to the locations of the word or words being spell checked. For example, in the first option described above and illustrated in FIG. 4A, the invention may be spell checking all the words in the visible extent using an ad hoc dictionary that comprises all of the locationary words whose location falls within (optionally, either entirely or partly) the visible extent of the displayed map. Map 32 of FIG. 3 shows five features (polygons) from a locationary feature class that fall at least partially in the map. Only four of those locationary features are visible on the smaller Map 34 of FIG. 4A ("White House", "Capitol", "Arlington National Cemetery", "McNair"). The fifth locationary feature (35) named "Anacostia" is completely off the visible extent of Map 34. If the spell checker is run on Map 34 using the visible extent option, the names of these four locationary features ("White House", "Capitol", "Arlington National Cemetery", and "McNair") will be included in the ad hoc dictionary. The spell checker would compare the words/strings to spell check text from the visible map extent ("White House", "Potomac", "Arlington National Cemetery", "McNair", "Anacostia") with the words/strings in the ad hoc dictionary, and would determine that "Alington National Cemetery" is misspelled by determining that the exact string "Alington National Cemetery" is not found in the ad hoc dictionary (because "Arlington" is misspelled). It would also consider "Potomac" and "Anacostia" as a potential misspelling as no locationary features of those names are within the currently visible extent of the map.

As discussed above and as illustrated in FIG. 43, in another option the invention may spell check words using an ad hoc dictionary that comprises all of the locationary words/strings whose valid location falls within (optionally, either entirely or partly) a spatial relationship of the misspelled word. For example, the ad hoc dictionary may be populated with all locationary words/strings whose valid locations fall within a radius/buffer distance that can be specified by the user. Because the locationary features that fall within a radius/buffer distance of a word are different for each word, under this option the process must be run for each word to be checked. That is, an ad hoc dictionary must be created for each word to be checked, used to check that one word and to find correctly spelled suggestions if the word is misspelled, and then discarded. Because this is inherently time and resource intensive, this second option is typically only used to further check a word that has already been checked using the faster methods, such as with conventional and extent locationaries (the first option described above) and considered to be potentially misspelled. If a word is determined by the faster first option to be correctly spelled, that word will not be checked using the slower second option.

Figure 12:
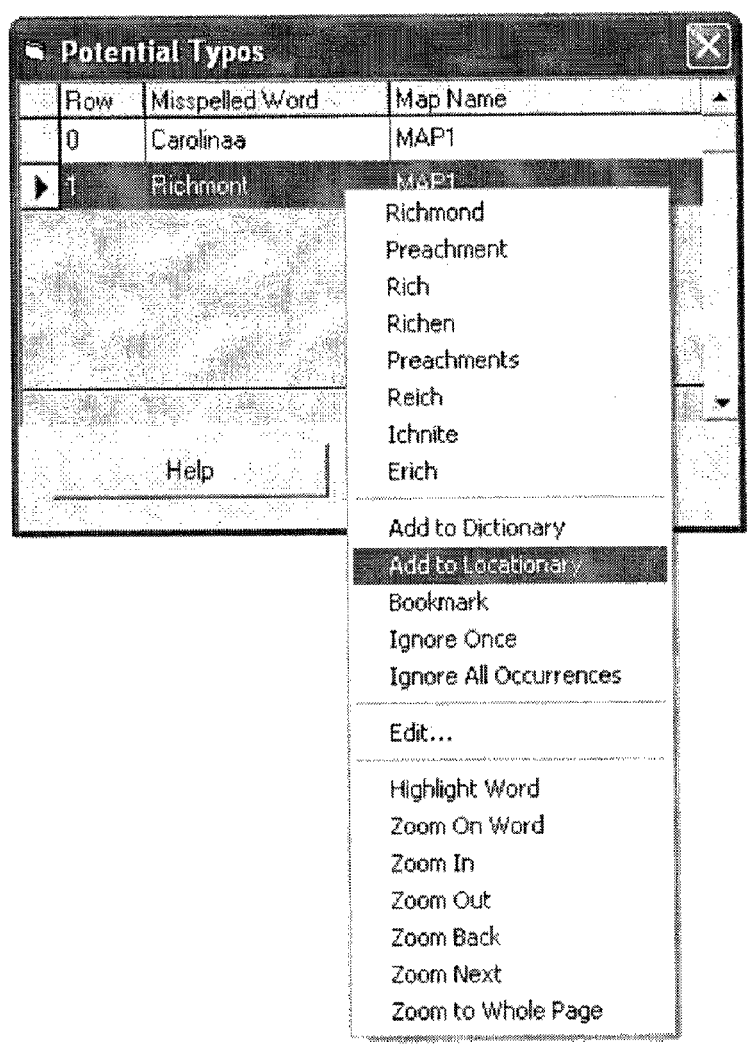
FIG. 12 is an illustration of a Potential Typos dialog box that lists the spelling errors and its associated context menu, which lets the user interact with the error, in accordance with one embodiment of the present invention.

FIG. 4B illustrates how this second option may be used. Let us assume a situation where a locationary feature will be considered in the spell checking process if it is at least partially within the radius/buffer distance to be considered. For each word being spell checked, the invention creates a buffer 37 of a distance specified by the user. Such buffers are illustrated together in FIG. 4B, even though they are created one at a time for each word actually being considered, are typically not shown to the user, and are removed from memory before the next buffer is created. The buffers illustrated here to describe the various spatial relationships between the text and the nearby locationary features, which will influence the outcome of the spell checking operation. With radius spell checking, the system would consider the first string to spell check, buffer the text string by a predefined or user-specified distance (500 feet in the illustration), determine which locationary features are at least partially within that buffer (according to one embodiment of the present invention), and output those locationary features' names into an ad hoc 'radius' dictionary. The system would then feed the word to be spell-checked and the word's corresponding ad hoc radius dictionary to a spell checking engine. If the latter finds a potential typo, it will use the values of this ad hoc dictionary (along with other dictionaries, if any) to generate a list of suggestions and populate the Potential Typo dialog with this typo and its corresponding context menu with the replacement suggestions (as illustrated in FIG. 12). In the example of FIG. 4B and assuming no other dictionary or locationary is used, the system would spell check "White House" map text, find a "White House" feature for the locationary within the buffer, export the name field of that feature to an ad hoc radius dictionary and feed the dictionary and word to be spell checked (i.e., "White House") to the spell checking engine which will find the word correctly spelled. The invention would then process the next word to spell check in a similar manner. Note that spell checking the map text "Anacostia" will result in a different outcome than with the visible extent operator illustrated earlier. Using radius checking, "Anacostia" will be considered correctly spelled. Even though the corresponding locationary feature of the map text "Anacostia" is outside the visible extent of the Map 34, its radius/buffer is within reach of the locationary feature with the same string value. Therefore that string will be in the ad hoc dictionary fed to the spell checker and the latter will find "Anacostia" correctly spelled.

The terms visible extent locationary, radius locationary, visible extent dictionary, and radius dictionary are used herein to indicate what spatial criteria is used to query a locationary and generate a corresponding ad hoc dictionary from the locationary. Features from a single locationary can be queried within the current visible map extent. In such a case, the locationary would be termed a visible extent locationary and the ad hoc dictionary generated from it would be referred to as a visible extent dictionary. When features from the same locationary are selected within a radius/buffer distance of a word to spell check, the locationary would be termed a radius locationary and the ad hoc dictionary generated from it would be referred to as a radius dictionary. Note, FIGS. 6A, 6B, 7, and 8 refer to "visible extent" locationaries and dictionaries and "radius" locationaries and dictionaries for clarity purposes only.

Visible extent spell checking and radius spell checking are independent of each other. Embodiments of the invention may perform either or both, on one or more locationaries, dependent upon a predefined or user-selected option.

FIG. 5A presents the pseudo-code for detecting spelling errors in a GIS map in batch mode and displaying a dialog with the errors. FIG. 5B illustrates the changes that occur to FIG. 5A when a danger dictionary is used, One skilled in the art will readily interpret the pseudo-code presented in these figures to understand the operation of the embodiment described in these figures, so the pseudo-code will not be described in detail herein. Rather, the flowcharts of FIGS. 6A, 6B, 7, and 8 will be used to describe an embodiment of the invention in more detail.

Figure 6A:
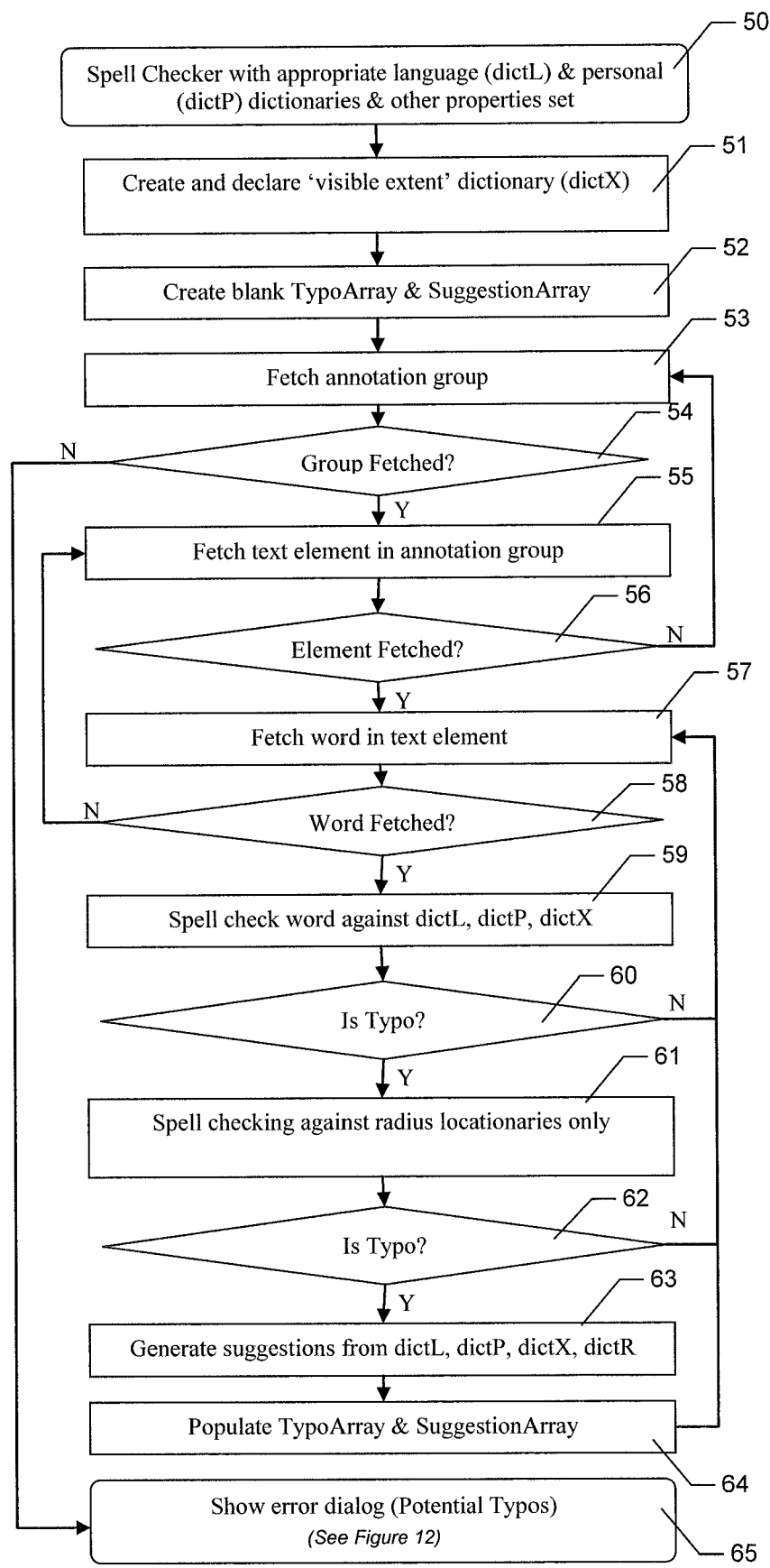
FIG. 6A is a flowchart illustrating the process of spell checking a map when both visible extent and radius locationaries are to be used, in accordance with one embodiment of the present invention.
Figure 6B:
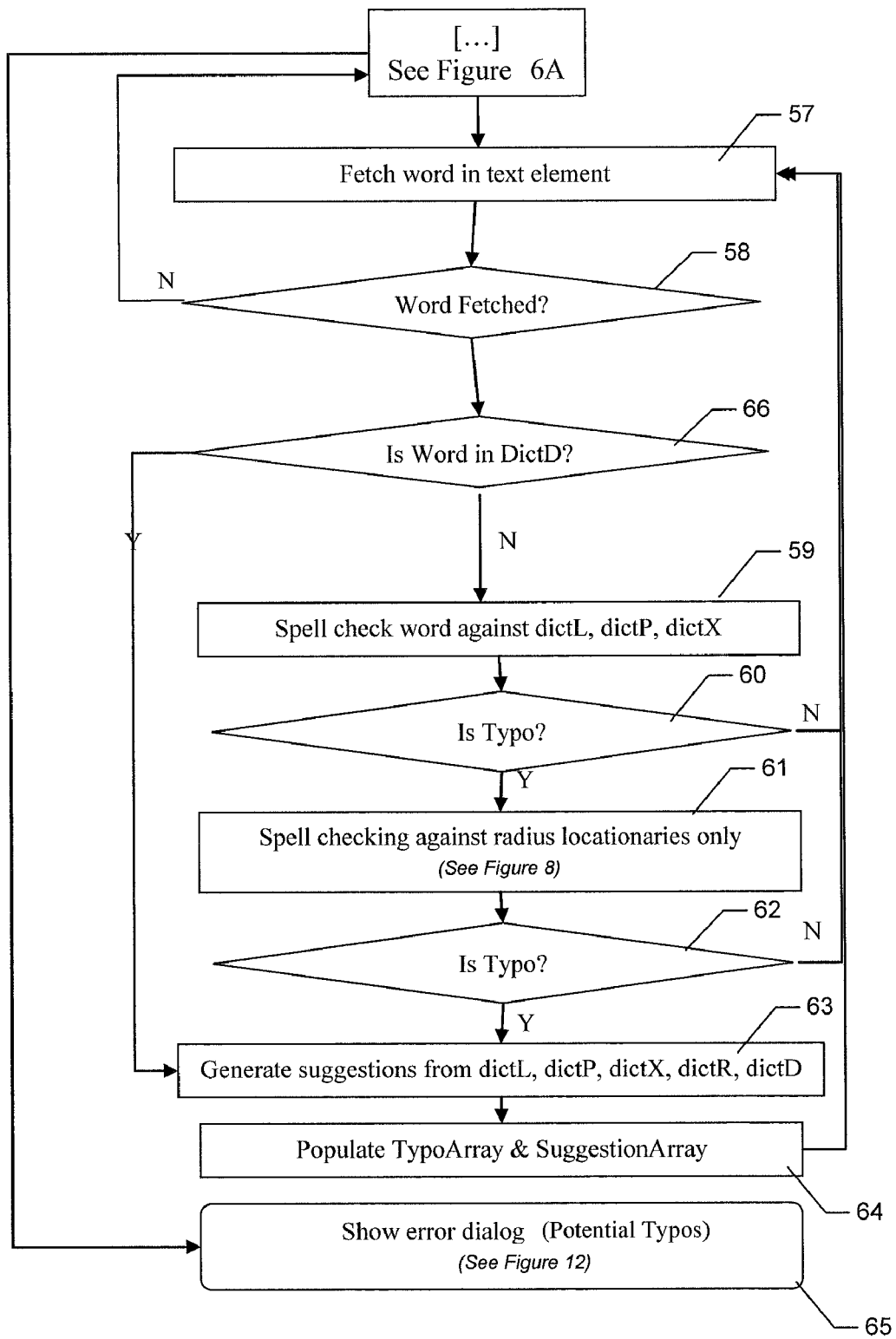
FIG. 6B is a flowchart illustrating the changes to FIG. 6A when a danger dictionary (DictD) is to be considered, in accordance with one embodiment of the present invention.
Figure 8:
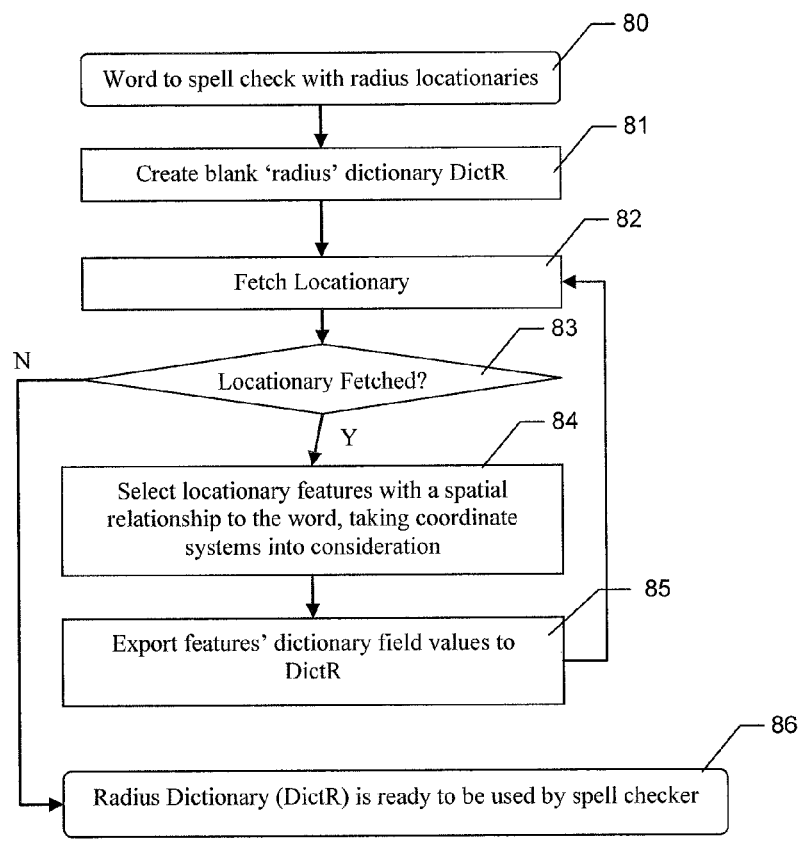
FIG. 8 is a flowchart illustrating the process for creating a radius dictionary for a single word to check, in accordance with one embodiment of the present invention.

FIG. 6A is a flowchart for detecting spelling errors in a map in batch mode when both visible extent and radius locationaries are to be used. FIG. 6B illustrates the changes that occur to FIG. 6A when a danger dictionary is used. The process of creating a visible extent dictionary for a specific map is illustrated in FIG. 7. FIG. 8 illustrates the process of creating a radius dictionary when checking a single word against radius locationaries.

Figure 10:
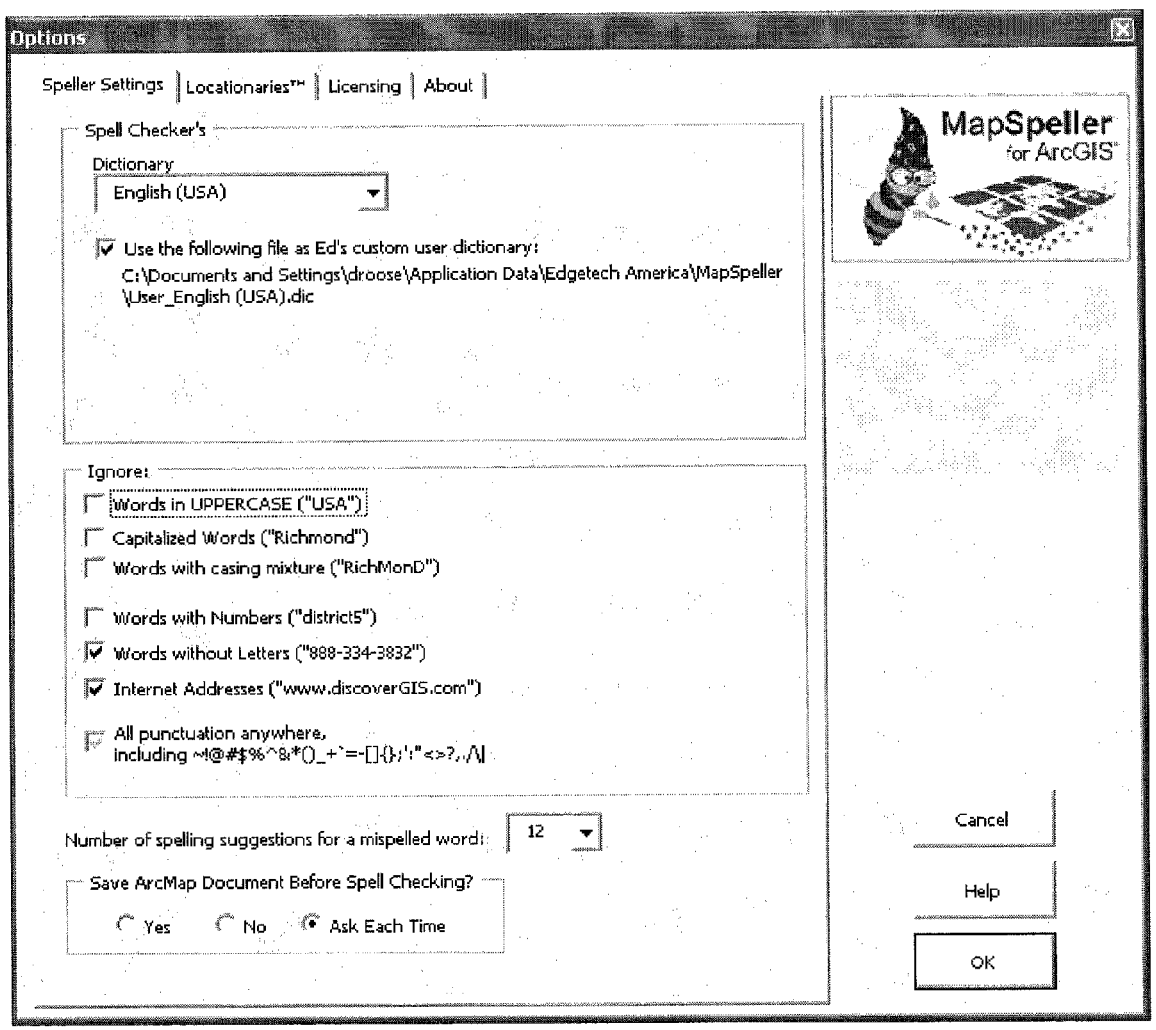

In the process illustrated in FIG. 6A, an embodiment of the invention sets the spell checking engine to use the conventional language (also termed system) dictionary ("dictL") and personal (also termed user) dictionary ("dictP") based on the information provided by the user in the Options dialog—Speller Settings tab (illustrated in FIG. 10)(see block 50). The invention also sets other properties from that dialog page as well as keeps some default spell checker properties. The user can also decide not to use any of those conventional dictionaries. This could be done, for example, to avoid using some geographic names from the conventional dictionaries that may not apply to the particular area being spell checked.

After determining which conventional dictionaries to use, the invention determines which visible extent locationaries should be used based on the user selections in the Options dialog Locationaries tab (illustrated in FIG. 11). That dialog shows a personal locationary, however it is trivial to extend the logic to a combination of personal and system locationaries. The invention proceeds to create a blank ad hoc visible extent dictionary to the specifications of the spell checker engine (see block 51). Additional details of the creation of visible extent ad hoc dictionaries are provided in FIG. 9.

Then, and for all the visible extent locationaries, the invention selects the features of those locationaries within the currently visible extent of the map and exports the values of the field holding the textual dictionary information (typically the name of the feature) to the single visible extent dictionary (see FIG. 7 which illustrates the creation of a visible extent dictionary). That dictionary is declared to the spell checker either after its creation or after it has been populated with the words from the visible extent locationaries within the currently visible extent of the map (see block 51).

An array (termed TypoArray) is created in memory of the computer to hold the text graphics with the spelling error that will be found (see block 52). One row will be created per misspelled word that will store information about that word, including a reference number, the word in error, the position of the word in error in the text graphic string, and a pointer to the text graphic itself. All this information is critical to fixing the error and updating the original object on its map. A separate array is created to store the correctly spelled suggestions that will be shown in the context menu illustrated in FIG. 12. Alternatively, 4 single array could have been built to hold the information from both arrays.

These arrays are created because this invention first detects all errors in a batch mode and then presents them all to the user in the Potential Typos window of FIG. 12, such that the user can visualize and fix each misspelled word, either one at a time or in groups. Conventional spell checkers behave differently—they ask the user to fix typos as they are found individually. This may be impractical in a GIS system because of the time required to convert the locationaries into dictionaries and because of the potentially large amount of text present on maps. The batch-mode error detection and replacement suggestion process frees the user to perform other activities while typos and replacement suggestions are found.

In the presented embodiment of this innovation, the invention will potentially spell check the same word twice. This is done because, as mentioned above, spell checking against radius locationaries is significantly slower than spell checking against the conventional and visible extent locationaries together. A word may be spell checked against radius locationaries only if it is considered misspelled by the other dictionaries and locationaries. Furthermore, the radius dictionaries are created from locationaries on a word-by-word basis; the radius dictionary being specific to that word and being created as that word is being processed. If the word is considered an error, a list of suggested corrections is created right away by the spell checker while it still has all these conventional, visible extent and radius dictionaries available. The suggestions are placed in the SuggestionArray for later use.

The invention loops through all annotation groups (including the default one) of the map graphics layer and fetches each text element and each word in each text element (see blocks 53-58). For each text graphics found, the invention spell checks each word as follows. The invention spell checks the words against the conventional language (system) dictionary(ies) ("dictL") and user dictionary(ies)("dictP") as well as against the visible extent dictionary ("dictX") created from all the specified visible extent locationaries (see block 59). If the word is found in those dictionaries, it is not misspelled and no further action is required with that word (see block 60) and the invention loops to the next word. If the word isn't found and at least one radius locationary is to be used, it can still be spelled properly if it was within the specified spatial relationship to one feature of the same spelling, for example within a specified radius of a feature with the same spelling of a radius locationary. Thus, the word is spell checked against a radius dictionary created from a radius locationary (see block 61). The creation of a radius dictionary is illustrated in FIG. 8. The features of the radius locationaries in a radius around the word to spell check are different for each word. Therefore, the locationaries must be selected around the one word to spell check at a time, and exported to a radius dictionary before the word can be spell checked against that dictionary. To make file handling easier, a single radius dictionary name is used for all text to spell check. The file is deleted and recreated each time the invention handles a new word to spell check.

If the word is found in the radius dictionary, it is not misspelled and no further action is required with that word (see block 62). If the word is not found in the radius dictionary and is therefore still a considered misspelled, the invention finds correctly-spelled suggestions from all the dictionaries involved: conventional system ("dictL"), user ("dictP"), visible extent ("dictX") and radius ("dicta") dictionaries, whichever applies as determined by the Options dialog (see block 63). The located typos are placed in the TypoArray, and the suggestions are placed in a SuggestionArray, one row per misspelled word and one column per suggested word (see block 64). The number of suggestions wanted may also be specified in the Options dialog. The invention iterates to the next word of the text graphics if there is one; otherwise, it iterates to the next text graphics if there is one; otherwise, it iterates to the next annotation group if there is one.

When the invention has iterated through all the annotation groups and has not found a single mistake, it displays a dialog informing the user that such is the case and the spell checking process is over; otherwise, it displays the Potential Typos dialog with TypoArray populating its grid (illustrated in FIG. 12)(see block 65).

As mentioned above, the invention may also use a danger dictionary and FIG. 6B illustrates the changes that occur to FIG. 6A when a danger dictionary is used. For each word fetched in block 58, the word is checked against the danger dictionary (see block 66) prior to any other dictionary or locationary spell checking. If found, the word is considered in error regardless of its presence in other dictionaries or locationaries. This enables users to make sure that certain correctly-spelled words will always be considered as potential typos, for example that "pubic" be considered a potential typo as it usually is a typo for the word "public." The invention skips the dictionary and locationary spell checking steps described in blocks 59-62, but still use those dictionaries and locationaries as indicated in the invention Options dialog to find correctly-spelled suggestions to the danger word (see block 63). The danger dictionary itself may also contain likely suggestions to the danger word.

Referring now to FIG. 7 which illustrates the creation of a visible extent ad hoc dictionary. After the spell checker invention is started (see block 70), an empty visible extent dictionary ("dictX") is created (see block 71). The visible extent of the current map is captured from the GIS system (see block 72). The first desired visible extent locationary is fetched (see block 73). The visible extent is projected to the coordinate system of the locationary (see block 75), the locationary features within the projected extent are selected (see block 76), and the field values (i.e., the words/strings) of those selected features are exported to the visible extent dictionary (see block 77). Steps 73-77 are repeated for all visible extent locationaries until there are no more visible extent locationaries to fetch (see block 74), and then the visible extent dictionary is ready to be used by the spell checker (see block 78).

Referring now to FIG. 8, the creation of a radius dictionary is illustrated. After a word has been identified as a potential typo using other types of dictionaries and/or locationaries a visible extent dictionary such that it has been determined to radius spell check word (see block 80), an empty radius dictionary ("dict") is created (see block 81). The first desired radius locationary is fetched (see block 82). The locationary features within the radius are selected from the locationary (see block 84), and the field values (i.e., the words/strings) of those selected features are exported to the radius dictionary (see block 85). Steps 82-85 are repeated for all radius locationaries until there are no more radius locationaries to fetch (see block 83), and then the radius dictionary is ready to be used by the spell checker (see block 86) for that one potential typo.

Figure 9:
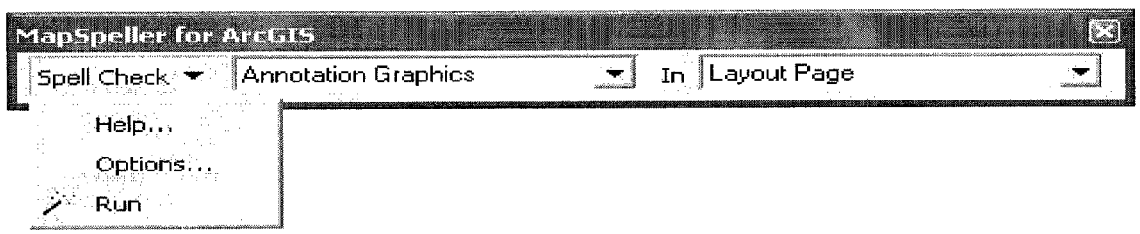
FIG. 9 is an illustration of a toolbar for setting the properties and running the GIS spell checker, in accordance with one embodiment of the present invention.

Referring now to FIG. 9, a GIS spell checker toolbar is illustrated which provides user access to the functionality specific to spell checking the map document. Typically, the toolbar would be delivered as an extension to the core GIS software package. The toolbar of the embodiment presented here has two combo boxes and a drop-down menu with three choices. The combo boxes let the user specify what GIS objects (e.g., text graphics) in what GIS container (e.g., the layout page) to spell check.

A GIS toolbar (FIG. 9) is used to set the properties of the spell checker to determine which and how locationaries are to be used. The "Options" menu choice lets the user access the multi-page Options dialog (illustrated in FIGS. 10 and 11). The Speller Settings page (FIG. 10) lets the user change conventional properties of the spell checker such as the language and personal dictionaries (if any), the number of correctly-spelled suggestions per misspelled word found. The Locationaries page (FIG. 11) lets the user decide which locationary to use if at all, and in what manner (e.g., visible extent, radius). This dialog could be modified to allow any locationary to be used with both visible extent and radius functions-as both a visible extent locationary and a radius locationary. This dialog could also be extended to access multiple system, internet, and personal locationaries.

Only objects that are visible in the GIS container will intentionally be spell checked. This is done intentionally to control the amount of text to spell check, and as a complementary mean given to the user to control what will be spell checked. GIS datasets can be very large and contain many pieces of text. Spell checking all of them every time the spell checker is used would be too lengthy and unnecessary. For example, when a paper map needs to be printed, it is pointless to go on and spell check the entire data frame or the full extent of the GIS layers involved if it will not show on the paper map. Only the text shown on the end product, the paper map, is important at that time. So, if the user has zoomed in on a portion of the map data, only that portion of the data will be spell checked.

This procedural philosophy is also used in other circumstances. For example, if the map has text with scale-dependent visibility, this text will only be spell checked when it is visible when the spell checker is run. Text with scale-dependent visibility refers to pieces of text that only show when the map is drawn at certain scale values. This is a way for the invention to control the amount of text to spell check. The user can use this to tune the spell checking target specified in the spell checker toolbar (FIG. 9), for example, by:

(1) Dragging objects outside of the layout page that do not need to be spell checked but would otherwise be because they belong to the toolbar's target.

For example, one could drag one data frame (map) outside of the layout page if one doesn't want that data frame to be spell checked while leaving the target combo box in the toolbar set to Layout Page.

(2) Controlling the map extent. If one wants to spell check an entire layer, one can zoom to the full extent of that layer in the data frame (map) and set the toolbar target combo box to that data frame (map).

Once those settings are properly set, the user start the spell checking process by selecting the "Run" menu choice from the Spell Check menu of the toolbar. The spell checker quickly displays a progress dialog indicating how far along it is in building TypoArray and SuggestionArray. When the invention has iterated through all the annotation groups without finding a single mistake, it displays a dialog informing the user that such is the case and the spell checking process is over; otherwise, it displays the Potential Typos dialog with TypoArray populating its grid (illustrated in FIG. 12). The user would then right-click on the row with the word in error from the Potential Typos dialog to display a context menu (also illustrated in FIG. 12) which shows, among other items, correctly-spelled suggestion words. Selecting one suggestion from that list will replace the spelling of the misspelled word with that suggestion in its text graphic and automatically update the map. The invention is able to achieve this because it keeps the offset of the misspelled word within the map text graphic as well as the reference to the actual text graphic in its TypoArray. The row with the misspelled word is removed from the Potential Typos dialog as the typo has been corrected.

The context menu also lets the user add the word to the user's user conventional dictionary if it is not considered spatially-bound, or to the user's personal dictionary or locationary otherwise. In the illustrated embodiment of the invention, the geometric envelop of the text graphic as it appears at that time in the map is added to the locationary with the string value stored in its attribute table. Again, this lets the user create a locationary with features of varying sizes to reflect that some words have a wider spatial meaning, spelling than others.

The user can also bookmark the extent of the text graphic for viewing or fixing at a later time, or can ignore the word or each occurrences of that word in the Potential Typos dialog. This is made easy by the fact that each row corresponds to a misspelled word as opposed to a text graphic object, which could hold a multi-word phrase for example.

In the bottom section of the context menu are commands that let the user identify the text on the map on the page layout. The zooming operations don't change the extent of the data in the map (data frame) but instead brings the layout page closer or farther in the same manner than bringing a paper map closer or further to one's eyes would make this map appear bigger or smaller without actually changing what being on the paper.

Figure 13:
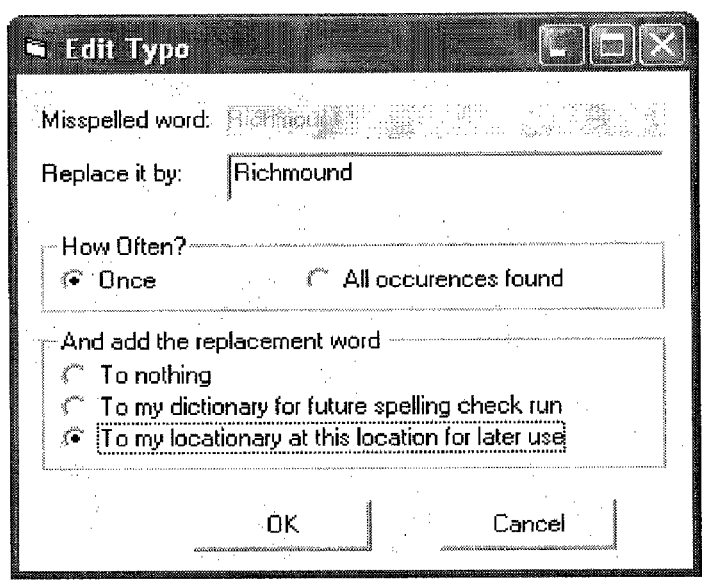
FIG. 13 is an illustration of an Edit Typo dialog box that enables a user to manually correct a typo and add the edited version to a personal dictionary or locationary, in accordance with one embodiment of the present invention.

The "Edit . . . ", command in the context menu calls the Edit Typo dialog (illustrated in FIG. 13). The latter lets the user manually change the spelling of the word that was clicked on in the Potential Typos dialog. The user can decide to have all occurrences of the misspelled word in the Potential Typos dialog at that time be replaced by the typed-in word. In addition, the typed-in word can be added to the user personal dictionary or locationary. If all occurrences of the word are replaced together, the user can decide to add all occurrences to the user's personal locationary, providing more automation than what is possible from the "Add to Locationary" choice in the Potential Typos context menu, which only adds the selected word to the locationary.

The Potential Typos dialog shows the misspelled words found in the spell checking process (one per row) while its context menu illustrates how each error could be visualized on the map and corrected or ignored.

Embodiments of the invention may include a method for automating the locationary and/or dictionary language selection based on the location of a piece of text in the map in a multi-lingual map. Typically the language of text or name places on a map is that of the intended map reader, that of the language or languages commonly spoken in the area on Earth over which the text lies on the map, or a combination of both. This innovation provides for a way for automatically spell checking text based on which linguistic area the text lies, in addition to the language(s) of the intended reader(s). The invention includes two broad methods for multi-language spell checking.

The first method comprises using conventional dictionaries in the languages of interest (individual or merged language files) and a multi-lingual locationary. The multi-lingual locationary can be any variant of a non uni-lingual locationary. For example, a multi-lingual locationary could have all its words in all the languages of interest or have words in a specific language in certain areas and in another language in other areas. Those areas could correspond to countries, for example. Spell checking using this method is no different than spell checking in a single language environment other than more dictionaries may have to be referenced. However, this method may not provide the same level of flexibility as the second method described below which uses automatic spell checking language selection. The second method allows single uni-lingual locationaries to spell check uni-lingual and multi-lingual maps.

Figure 14:
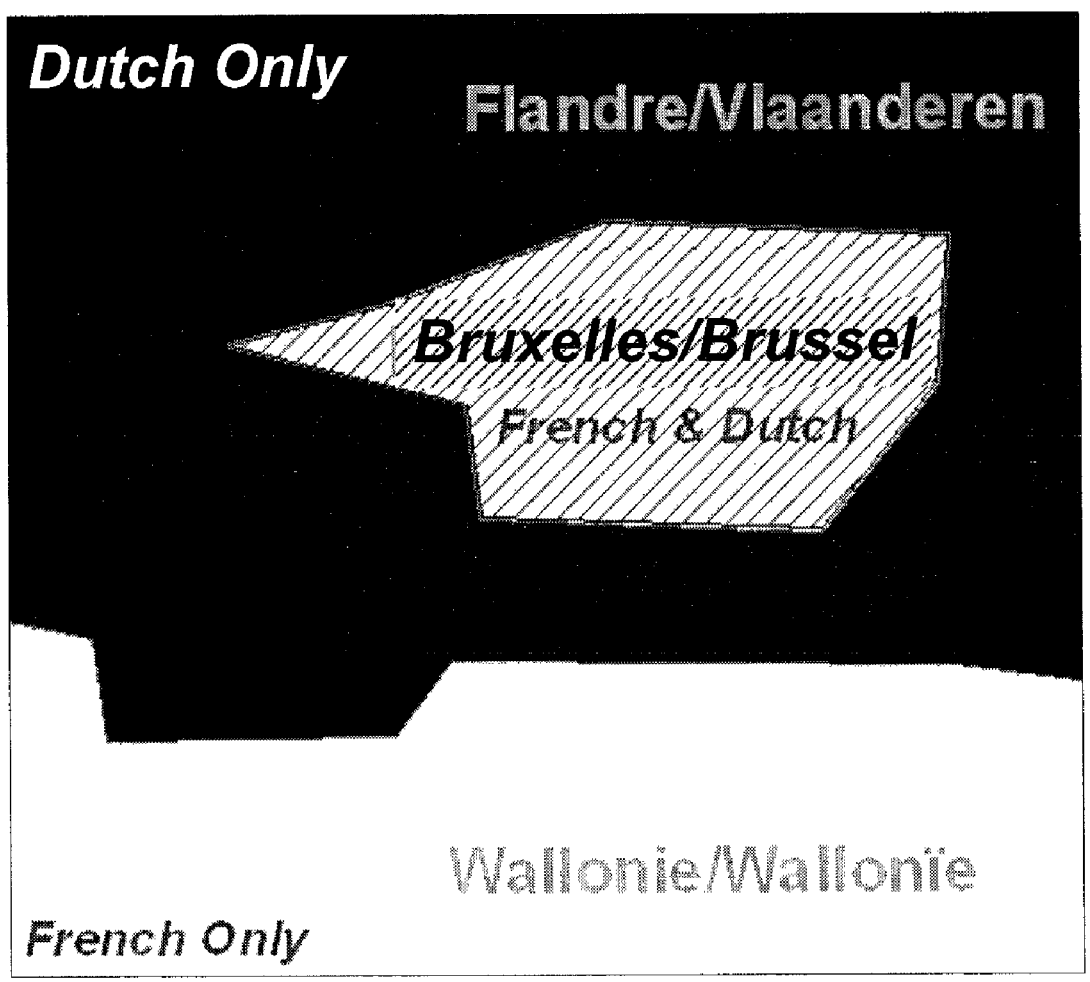
FIG. 14 illustrates the automatic selection of spell checking languages, in accordance with one embodiment of the present invention.

The second method uses a feature termed an Automatic Spell Checking Language Selection Innovation. When enabled, this feature is able to automatically select one or several languages to be used when spell checking and correcting each piece of text based on what language or languages are commonly spoken at the location of each piece of text being spell checked. For example, FIG. 14 illustrates the official languages in and around the city of Brussels, Belgium. French and Dutch are the official languages in the city itself (the city is indicated by the cross-hatched area. Dutch is the only official language in Flanders (this region is indicated by the black area). French is the only official language in Wallonia (this region is indicated by the white area). These regions have been labeled with their French and Flemish names, in that order and separated by a backslash ("/").

The spell checker would find out in which linguistic region each piece of text relates to (typically this means which region the text falls at least partially into) and spell check it with the appropriate language dictionaries and locationaries. In the case illustrated in FIG. 14, it will use Dutch dictionaries and locationaries to spell check "Flandre/Vlaanderen" as Dutch is the only official language in the region in which that text is located. It will determine that "Vlaanderen" (the Dutch spelling) is correctly spelled, and "Flandre" (the French equivalent) is incorrectly spelled. In Brussels city (the cross-hatched area), it will find that both the French (Bruxelles) and Dutch (Brussel) spellings for Brussels are correct as both languages are official. In the French speaking Wallonia, it will find that only "Wallonia" is correctly spelled and not its Dutch equivalent "Wallonie".

The language of the intended map reader can also be added to this scenario and in that case, the text "Flanders," "Brussels," and "Wallonia" could also be placed and would all be correctly spelled if the intended reader's language was English and an English-language dictionary was available. If only an English locationary was available, those names would be correct if they matched a locationary feature within the spatial spelling criteria associated with that locationary.

Although most likely polygonal, the lookup language GIS feature class can be of any type, including point, line, polygon. FIG. 14 uses linguistic regions (polygons) and the "Is contained by the linguistic region" spatial operator to find out which languages to use. Other operators such as "Is within a radius of the linguistic feature" should also be available to use with linguistic feature types without area, including points, lines and to support a variety of situations.

Below is a workflow to further describe the method for spell checking with the Automatic Spell Checking Language Selection System. One skilled in the art will readily interpret the workflow below to understand the operation of the embodiment described, so the workflow will not be described in detail herein.

1) The user sets up the Automatic Spell Checking Language Selection System
   a) Turns the option on
   b) Determines which dictionary and locationary files to consider for each potential language of the map
   c) Chooses what spatial criteria should be used for the automatic selection, for example:
      i) Is completely contained by the linguistic region
      ii) Is contained or partially contained by the linguistic region
      iii) Is within a radius of the linguistic feature
2) The user runs the spell checker
3) For each word to spell check, the spell checker:
   a) Selects the language map for features matching the spatial criteria above
   b) Finds out which languages to use from the attribute table of the selected language map features
   c) Identifies the dictionaries and locationaries to be used
      i) They should be among those made available by the user in the setting stage
      ii) Match the languages identified in the previous step
   d) Find typos and generate suggestions from those dictionaries and locationaries
4) Calls the Potential Typos dialog from which errors can be viewed and fixed as illustrated elsewhere.

As an alternative to having a separate locationary per language, a single locationary may be provided that has a separate field for each language. In such a locationary, the language of each field would be specified, thereby enabling the invention to select those words from the locationary that match the desired language.

In addition to being used for spell checking text, locationaries and the spell checking methods of the present invention can also be used to find out which pieces of text are too far from the features (geographic object) that they label or are associated with. This is achieved by turning the conventional, danger, and personal dictionaries off and relying uniquely on locationaries. Words outside the spatial criteria used would be listed as potential typos while those correctly spelled and inside the spatial area would not.

The method of spell-checking location-bound words within a document may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the processing element of the server.

In this regard, FIGS. 6A, 6B, 7, and 8 are flowcharts of methods and program products according to the invention. It will be understood that each step of the flowchart, and combinations of steps in the flowchart, can be implemented by computer program instructions. These computer program instructions may be loaded onto one or more computers or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims Although specific terms are employed herein, they are used in a generic and descriptive sense only and not for purposes of limitation.

That which is claimed:

1. A computer-implemented method for spell-checking location-bound words contained in a geographic information system (GIS) map, database, or document, each location-bound word having a location corresponding to a real-world geographic location, each location being predetermined in a GIS map, database, or document and having an associated geometry, the method comprising the steps of:

providing a locationary comprising a plurality of words, each locationary word having a spelling, and, for each locationary word, a corresponding geographic location and geometry within which the provided spelling of the locationary word is predetermined to be correctly spelled;

for each location-bound word being spell-checked, retrieving the location and geometry of the location-bound word from the GIS map or a layer of the GIS map, and identifying one or more locationary words whose location and geometry within which the provided spelling is correctly spelled has a predefined spatial relationship to the retrieved location and geometry of the location-bound word; and for each location-bound word being spell-checked, comparing a spelling of the location-bound word being spell-checked to the spelling of the identified locationary words to determine if the location-bound word being spell-checked is correctly spelled.

2. The method of claim 1, wherein the locationary comprises a thematically heterogeneous geographic information system (GIS) feature class, each feature of the feature class comprising one of the correctly spelled locationary words and its corresponding geographic location and minimum geometry.

3. The method of claim 1, wherein the geometry of each locationary word comprises an annotation feature, point, line, bounded area, or bounded volume, and wherein the location and geometry of a locationary word has a predefined spatial relationship to the location and geometry of the location-bound word being spell-checked if at least part of the annotation feature, point, line, bounded area, or bounded volume of the locationary word falls within a current extent of a map that contains the location-bound word being spell-checked.

4. The method of claim 3, further comprising the step of:
if the location-bound word being spell-checked is determined to be correctly spelled by the first comparing step, further comparing the location-bound word being spell-checked to those words in the locationary whose location and geometry falls within a predefined or user-specified distance from the location-bound word being spell-checked to determine if the location-bound word being spell-checked is correctly spelled;
wherein the location-bound word being spell-checked will be considered to be too far from a feature labeled by the location-bound word being spell-checked if the location-bound word being spell-checked is determined to be incorrectly spelled by the second comparing step.

5. The method of claim 1, wherein the geometry of each locationary word comprises an annotation feature, point, line, bounded area, or bounded volume, and wherein the location and geometry of a locationary word has a predefined spatial relationship to the location and geometry of the location-bound word being spell-checked if at least part of the annotation feature, point, line, bounded area, or bounded volume of the locationary word falls within a predefined or user-specified distance from the location-bound word being spell-checked.

6. The method of claim 5, further comprising the steps of:
repeating the comparing step for a plurality of location-bound words;
after each comparing step and for each incorrectly spelled location-bound word, determining one or more suggested spelling corrections; and
after each determining step, storing the one or more determined suggested spelling corrections.

7. The method of claim 1, wherein the location-bound words are contained in a map, and wherein the method further comprises the steps of:
identifying a word in the locationary that matches a textual label of a feature in the map;
calculating a distance between the textual label and the location and geometry of the matching locationary word; and
comparing the calculated distance to a predefined or user-specified maximum acceptable distance to determine if the textual label is too far from the label's associated feature.

8. The method of claim 1, further comprising the step of:
creating an ad hoc dictionary comprising those words in the locationary whose location and geometry has a predefined spatial relationship to the location and geometry of the location-bound word being spell-checked.

9. The method of claim 8, further comprising the steps of:
providing the ad hoc dictionary to a spell-checking software program; and
providing a location-bound word to the spell-checking software program;
wherein the comparing step is performed by the spell-checking program using the ad hoc dictionary.

10. The method of claim 9, further comprising the step of:
providing all location-bound words to be spell checked to the spell-checking software program to enable the spell-checking program to determine if the location-bound words being spell-checked are correctly spelled using the ad hoc dictionary.

11. The method of claim 10, further comprising the steps of:
receiving a list of potentially misspelled words from the spell-checking program;
creating a second ad hoc dictionary comprising those words in the locationary whose location and geometry corresponds to a portion of a map within a predefined or user-specified spatial relationship from one of the potentially misspelled words;
providing the second ad hoc dictionary to the spell-checking software program; and
providing the one of the potentially misspelled words to the spell-checking software program to enable the spell-checking program to re-check the one of the potentially misspelled words using the second ad hoc dictionary.

12. The method of claim 8, further comprising the step of:
providing one or more replacement suggestions for location-bound words determined to be incorrectly spelled, wherein the one or more replacement suggestions are selected from (a) the ad hoc dictionary, (b) one ore more standard dictionaries, or (c) the ad hoc dictionary and one or more standard dictionaries.

13. The method of claim 1, wherein the location and geometry of a locationary word has a predefined spatial relationship to the location and geometry of the location-bound word being spell-checked if at least part of the location and geometry of the locationary word falls within a predefined or user-specified distance from the location-bound word being spell-checked.

14. The method of claim 1, wherein the location and geometry of a locationary word has a predefined spatial relationship to the location and geometry of the location-bound word being spell-checked if at least part of the location and geometry of the locationary word falls within a current extent of a map that contains the location-bound word being spell-checked.

15. The method of claim 1, wherein the location-bound words being spell-checked are contained in a map, and wherein the method further comprises the steps of:
receiving a list of potentially misspelled words;
creating an ad hoc dictionary comprising those words in the locationary whose location and geometry corresponds to a portion of the map within a predefined or user-specified spatial relationship from one of the potentially misspelled words;

providing the ad hoc dictionary to a spell-checking software program; and providing the one of the potentially misspelled words to the spell-checking software program to enable the spell-checking program to re-check the one of the potentially misspelled words using the ad hoc dictionary.

16. The method of claim 1, wherein the method further comprises the steps of:

providing a plurality of locationaries, at least some of the locationaries each corresponding to a different language;

determining which one or more languages are spoken in the geographic location corresponding to the location and geometry of the location-bound word being spell-checked;

selecting the one or more locationaries which correspond to the one or more languages spoken in the geographic location corresponding to the location and geometry of the location-bound word being spell-checked; and comparing the location-bound word being spell-checked to those words in the selected locationaries whose location and geometry has a predefined spatial relationship to the location and geometry of the location-bound word being spell-checked to determine if the location-bound word being spell-checked is correctly spelled in one of the languages corresponding to the location and geometry of the location-bound word being spell-checked.

17. The method of claim 16, further comprising the steps of:

creating an ad hoc multi-language dictionary or a plurality of uni-language dictionaries comprising those words in the selected locationaries whose locations correspond to a current extent of a map that contains the location-bound word being spell-checked; and providing the ad hoc multi-language dictionary or the plurality of uni-language dictionaries to a spell-checking software program.

18. The method of claim 16, further comprising the steps of:

determining which language is a preferred language of a user; and selecting a locationary which corresponds to the preferred language of the user;

wherein comparing the location-bound word being spell-checked to those words in the selected locationaries whose location and geometry has a predefined spatial relationship to the location and geometry of the location-bound word being spell-checked further determines if the location-bound word being spell-checked is correctly spelled in the preferred language of the user.

19. The method of claim 16, wherein the method further comprises the steps of:

providing a language map depicting one or more geographic locations and corresponding one or more languages spoken at each of the one or more geographic locations;

wherein determining which one or more languages are spoken in the geographic location corresponding to the location and geometry of the location-bound word being spell-checked comprises determining which geographic location depicted in the language map corresponds to the location and geometry of the location-bound word being spell-checked and identifying the one or more languages are spoken at the determined corresponding geographic location.

20. The method of claim 19, wherein a geographic location depicted in the language map corresponds to the location and geometry of the location-bound word being spell-checked if the geographic location depicted in the language map (a) is within the location and geometry of the location-bound word being spell-checked, (b) is within a predetermined proximity to the location and geometry of the location-bound word being spell-checked, or (c) has a predefined spatial relationship to the location and geometry of the location-bound word being spell-checked.

21. The method of claim 1, wherein the locationary comprises a plurality of words in a plurality of different languages and, for each word, a corresponding geographic location and geometry within which a provided spelling of the word is correctly spelled and within which the language of the word is spoken language, such that comparing the location-bound word being spell-checked to those words in the locationary whose location and geometry has a predefined spatial relationship to a location and geometry of the location-bound word being spell-checked further determines if the location-bound word being spell-checked is correctly spelled in the spoken language.

22. The method of claim 1, further comprising the steps of:

providing a plurality of conventional dictionaries, at least some of the dictionaries each corresponding to a different language;

determining which one or more languages are spoken in the geographic location corresponding to the location and geometry of the location-bound word being spell-checked;

selecting one or more of the conventional dictionaries which correspond to the one or more languages spoken in the geographic location corresponding to the location and geometry of the location-bound word being spell-checked; and comparing the location-bound word being spell-checked to the selected dictionaries to determine if the location-bound word being spell-checked is correctly spelled in the one or more languages.

23. A computer-implemented method for spell-checking location-bound words contained in a geographic information system (GIS) map, database, or document, a location of each location-bound word corresponding to a real-world geographic location, each location being predetermined in a GIS map, database, or document and having an associated geometry, the method comprising the steps of:

providing a plurality of locationaries, at least some of the locationaries each corresponding to a different language, each locationary comprising a plurality of words, each locationary word having a spelling, and, for each locationary word, a corresponding geographic location and geometry within which the provided spelling of the locationary word is predetermined to be correctly spelled in the corresponding locationary language;

for each location-bound word being spell-checked, retrieving the location and geometry of the location-bound word from the GIS map or a layer of the GIS map;

determining which one or more languages are spoken in the geographic location corresponding to the retrieved location and geometry of the location-bound word being spell-checked;

selecting the one or more locationaries which correspond to the determined languages;

for each location-bound word being spell-checked, identifying one or more locationary words in the selected one or more locationaries whose location and geometry within which the provided spelling is correctly spelled has a predefined spatial relationship to the retrieved location and geometry of the location-bound word; and for each location-bound word being spell-checked, comparing a spelling of the location-bound word being spell-checked to the spelling of the identified locationary words to determine if the location-bound word being spell-checked is correctly spelled in the corresponding locationary language.

24. The method of claim 23, further comprising:

providing a plurality of dictionaries, at least some of the dictionaries each corresponding to a different language;

selecting the one or more dictionaries which correspond to the determined languages; and comparing the location-bound word being spell-checked to the selected dictionaries to determine if the location-bound word being spell-checked is correctly spelled in the corresponding dictionary language.

* * * * *